(12) United States Patent
McCarthy et al.

(10) Patent No.: US 9,790,980 B2
(45) Date of Patent: Oct. 17, 2017

(54) FASTENER NUT FOR CHANNEL FRAMING

(71) Applicant: Cooper Technologies Company, Houston, TX (US)

(72) Inventors: William E. McCarthy, Edwardsville, IL (US); James A. Knutson, Collinsville, IL (US); Zhihui Zhang, Edwardsville, IL (US); Joseph Kline, Kirkwood, MO (US)

(73) Assignee: Cooper Technologies Company, Houston, TX (US)

( * ) Notice: Subject to any disclaimer, the term of this patent is extended or adjusted under 35 U.S.C. 154(b) by 125 days.

(21) Appl. No.: 14/581,588

(22) Filed: Dec. 23, 2014

(65) Prior Publication Data

US 2015/0176631 A1 Jun. 25, 2015

Related U.S. Application Data

(60) Provisional application No. 61/971,635, filed on Mar. 28, 2014, provisional application No. 61/920,189, filed on Dec. 23, 2013.

(51) Int. Cl.
F16B 37/04 (2006.01)

(52) U.S. Cl.
CPC ....... *F16B 37/045* (2013.01); *Y10T 29/49947* (2015.01); *Y10T 29/49948* (2015.01)

(58) Field of Classification Search
CPC ...... F16B 37/045; F16B 37/046; F16B 7/187; F16B 7/043; F16B 7/0493; F16B 2/065;

(Continued)

(56) References Cited

U.S. PATENT DOCUMENTS

| 1,813,545 A | 7/1931 | Reinhold |
| 1,934,760 A | 11/1933 | Awbrey |

(Continued)

FOREIGN PATENT DOCUMENTS

| CN | 202416847 U | 9/2012 |
| DE | 7701100 | 5/1977 |

(Continued)

OTHER PUBLICATIONS

Drawing of MQM Wing Nut, (at least as early as Mar. 13, 2012), (1) pg.

(Continued)

*Primary Examiner* — James Ference
(74) *Attorney, Agent, or Firm* — Senniger Powers LLP

(57) ABSTRACT

A fastener nut for securing a part to channel framing defining at least one internal, generally T-shaped track extending lengthwise of the channel framing. The fastener nut includes a nut body, and first and second wings extending longitudinally outward from respective first and second longitudinal ends of the body. The first and second wings having respective terminal ends defining an effective wing span therebetween that is greater than the length of the body such that at least a portion of the fastener nut has a generally T-shaped side profile. The fastener nut is insertable in the generally T-shaped track of the channel framing to allow the fastener nut to slide along the length of the channel framing and to restrict transverse movement of the fastener nut in the interior, relative to length of the framing, for use in positioning the fastener nut along the channel framing.

18 Claims, 28 Drawing Sheets

(58) Field of Classification Search
CPC ......... Y10T 29/49948; Y10T 29/49947; Y10T 403/4674; Y10T 403/7067; Y10T 403/4602; F16L 3/00; F16L 3/24; E04C 2003/0421; E04C 2003/0465; E04C 2003/0473; E04C 2003/043; E04C 2003/0434; E04C 3/07
See application file for complete search history.

(56) References Cited

U.S. PATENT DOCUMENTS

| | | | |
|---|---|---|---|
| 1,963,908 A | 6/1934 | Manasek | |
| 2,307,653 A | 1/1943 | Wright | |
| 2,375,513 A | 5/1945 | Bach | |
| 2,420,826 A | 5/1947 | Irrgang | |
| 2,470,991 A | 5/1949 | Kindorf et al. | |
| 2,567,463 A | 9/1951 | Atkinson | |
| 2,676,680 A | 4/1954 | Kindorf | |
| 2,767,609 A | 10/1956 | Cousino | |
| 2,767,951 A | 10/1956 | Cousino | |
| 2,804,180 A * | 8/1957 | Richardson | F16B 37/044 29/512 |
| 2,846,169 A | 8/1958 | Sulllivan | |
| 2,944,642 A * | 7/1960 | Evans | A47B 57/54 403/22 |
| 3,005,292 A * | 10/1961 | Reiland | E04B 1/4107 411/116 |
| 3,226,069 A | 12/1965 | Clarke | |
| 3,266,761 A | 8/1966 | Walton et al. | |
| 3,310,264 A | 3/1967 | Appleton | |
| 3,312,034 A | 4/1967 | Steinmann | |
| 3,396,499 A | 8/1968 | Biffani | |
| 3,417,951 A | 12/1968 | Rebentisch, Jr. | |
| 3,451,183 A | 6/1969 | Lespagnol et al. | |
| 3,463,428 A | 8/1969 | Kindorf et al. | |
| 3,486,726 A | 12/1969 | Kindorf et al. | |
| 3,513,606 A | 5/1970 | Jones | |
| 3,527,432 A | 9/1970 | Lytle | |
| 3,547,385 A | 12/1970 | Kindorf | |
| 3,566,561 A | 3/1971 | Tozer | |
| 3,592,493 A | 7/1971 | Goose | |
| 3,601,347 A | 8/1971 | Attwood | |
| 3,612,461 A | 10/1971 | Brown | |
| 3,650,499 A | 3/1972 | Biggane | |
| 3,748,808 A * | 7/1973 | Sheppard | E04B 9/16 403/397 |
| 3,752,198 A | 8/1973 | Fiorentino et al. | |
| 3,757,485 A | 9/1973 | Vincens | |
| 3,863,300 A * | 2/1975 | Becker | B23P 11/00 24/291 |
| 3,944,308 A | 3/1976 | Persson | |
| 3,986,314 A | 10/1976 | Moeller | |
| 3,998,419 A | 12/1976 | Semmerling | |
| 4,044,428 A | 8/1977 | Kowalski | |
| 4,185,802 A | 1/1980 | Myles et al. | |
| 4,211,381 A | 7/1980 | Heard | |
| 4,216,930 A | 8/1980 | Rossler, Jr. et al. | |
| 4,227,355 A | 10/1980 | Wendt | |
| 4,358,216 A | 11/1982 | Pleickhardt et al. | |
| 4,379,651 A | 4/1983 | Nagashima | |
| 4,397,437 A | 8/1983 | Madej | |
| 4,417,711 A | 11/1983 | Madej | |
| 4,479,341 A | 10/1984 | Schuplin | |
| 4,490,064 A | 12/1984 | Ducharme | |
| 4,506,418 A | 3/1985 | Viola et al. | |
| 4,516,296 A | 5/1985 | Sherman | |
| 4,610,562 A | 9/1986 | Dunn | |
| 4,637,748 A | 1/1987 | Beavers | |
| 4,657,458 A | 4/1987 | Wollar et al. | |
| 4,666,355 A | 5/1987 | Stover | |
| 4,708,554 A | 11/1987 | Howard | |
| 4,726,165 A | 2/1988 | Brinsa | |
| 4,729,532 A | 3/1988 | Moss | |
| 4,784,552 A * | 11/1988 | Rebentisch | F16B 37/046 403/348 |
| 4,830,531 A | 5/1989 | Condit et al. | |
| 4,895,412 A * | 1/1990 | Deley | B60N 2/4492 297/284.9 |
| 4,934,886 A * | 6/1990 | Aikens | B25B 31/00 29/453 |
| 4,948,313 A | 8/1990 | Zankovich | |
| 4,950,099 A | 8/1990 | Roellin | |
| 4,961,553 A | 10/1990 | Todd | |
| 4,993,670 A | 2/1991 | Tesar | |
| 5,014,940 A | 5/1991 | Sherman | |
| 5,022,614 A | 6/1991 | Rinderer | |
| D322,929 S | 1/1992 | Abbestam et al. | |
| 5,078,537 A * | 1/1992 | Nomura | F16B 37/046 403/21 |
| 5,102,074 A | 4/1992 | Okada | |
| 5,116,161 A | 5/1992 | Faisst | |
| 5,118,233 A | 6/1992 | Mitchell | |
| 5,141,186 A | 8/1992 | Cusic | |
| 5,146,724 A | 9/1992 | Angelo | |
| 5,163,644 A | 11/1992 | Kowalski | |
| 5,175,971 A | 1/1993 | McCombs | |
| 5,205,022 A | 4/1993 | Norton | |
| 5,215,281 A | 6/1993 | Sherman | |
| 5,228,263 A | 7/1993 | Vaughn | |
| 5,271,586 A * | 12/1993 | Schmidt | F16L 3/24 248/58 |
| 5,274,888 A | 1/1994 | Payne | |
| 5,335,890 A | 8/1994 | Pryor et al. | |
| 5,351,926 A | 10/1994 | Moses | |
| 5,375,798 A | 12/1994 | Hungerford, Jr. | |
| 5,489,173 A | 2/1996 | Höfle | |
| 5,503,511 A | 4/1996 | Flamme | |
| 5,566,916 A | 10/1996 | Bailey | |
| 5,595,363 A | 1/1997 | De Leebeeck | |
| 5,628,508 A | 5/1997 | Koole | |
| 5,628,598 A | 5/1997 | Höfle | |
| 5,655,816 A * | 8/1997 | Magnuson | B60N 2/0292 297/232 |
| 5,655,865 A | 8/1997 | Plank et al. | |
| 5,718,403 A | 2/1998 | Ott et al. | |
| 5,729,948 A | 3/1998 | Levy et al. | |
| 5,746,535 A | 5/1998 | Kohler | |
| 5,779,412 A | 7/1998 | Nagai et al. | |
| 5,799,452 A | 9/1998 | Moore | |
| 5,799,907 A | 9/1998 | Andronica | |
| 5,806,268 A | 9/1998 | Koller | |
| 5,806,897 A | 9/1998 | Nagai et al. | |
| 5,820,322 A | 10/1998 | Hermann et al. | |
| 5,833,417 A * | 11/1998 | Sargent | F16B 37/046 248/58 |
| 5,855,342 A | 1/1999 | Hawkins et al. | |
| 5,864,997 A | 2/1999 | Kelly | |
| 5,918,999 A | 7/1999 | Lamarca | |
| 5,924,650 A | 7/1999 | Richichi | |
| 5,927,041 A | 7/1999 | Sedlmeier et al. | |
| 5,970,679 A | 10/1999 | Amore | |
| 5,984,243 A | 11/1999 | Pfaller et al. | |
| 5,988,930 A | 11/1999 | Liebetrau et al. | |
| 6,061,984 A | 5/2000 | Rose | |
| 6,062,764 A | 5/2000 | Rixen et al. | |
| 6,106,189 A | 8/2000 | Seale | |
| 6,195,953 B1 | 3/2001 | Gitter et al. | |
| 6,322,030 B1 | 11/2001 | Marra | |
| 6,347,904 B1 | 2/2002 | Knighton | |
| 6,454,232 B1 | 9/2002 | Roth | |
| 6,484,358 B1 | 11/2002 | Duong et al. | |
| 6,494,415 B1 | 12/2002 | Roth | |
| 6,561,473 B1 | 5/2003 | Ianello | |
| 6,572,057 B1 | 6/2003 | Roth | |
| 6,655,099 B1 | 12/2003 | Trenoweth | |
| 6,660,938 B2 | 12/2003 | Herb et al. | |
| 6,679,461 B1 | 1/2004 | Hawkins | |
| 6,682,253 B1 | 1/2004 | Binna et al. | |
| 6,712,543 B1 | 3/2004 | Schmalzhofer | |
| 6,726,117 B2 | 4/2004 | Herb et al. | |
| 6,751,914 B2 | 6/2004 | Zeh et al. | |
| 6,766,992 B1 | 7/2004 | Parker | |
| 6,802,171 B2 | 10/2004 | McKinnon | |
| 6,991,198 B1 | 1/2006 | Roth | |

(56) References Cited

U.S. PATENT DOCUMENTS

| | | |
|---|---|---|
| 7,014,213 B1 | 3/2006 | Kaiser |
| 7,044,701 B2 | 5/2006 | Herb |
| 7,070,374 B2 | 7/2006 | Womack et al. |
| 7,096,641 B2 | 8/2006 | Birnbaum et al. |
| 7,179,010 B2 | 2/2007 | Weger et al. |
| 7,240,884 B2 | 7/2007 | Shim |
| 7,287,733 B2 | 10/2007 | Bongio et al. |
| 7,389,621 B2 | 6/2008 | Hawes |
| 7,448,822 B2 | 11/2008 | Nebeker et al. |
| 7,478,787 B2 | 1/2009 | Bankston et al. |
| 7,484,697 B1 | 2/2009 | Nelson |
| 7,600,724 B2 | 10/2009 | Nelson et al. |
| 7,604,444 B2 | 10/2009 | Wu |
| 7,661,915 B2 | 2/2010 | Whipple |
| 7,818,925 B2 | 10/2010 | Benedict |
| 7,922,130 B2 | 4/2011 | Hawkins |
| 7,922,417 B2 | 4/2011 | Jimenez |
| 7,934,896 B2 | 5/2011 | Schnier |
| 7,984,601 B2 | 7/2011 | Birnbaum et al. |
| 8,100,600 B2 | 1/2012 | Blum |
| D654,064 S | 2/2012 | Sergi |
| 8,225,581 B2 | 7/2012 | Strickland et al. |
| 8,277,158 B2 * | 10/2012 | Csik ................... F16B 37/046 411/111 |
| 8,303,223 B2 | 11/2012 | Rass et al. |
| 8,341,913 B2 | 1/2013 | Meres et al. |
| 8,366,340 B2 | 2/2013 | Munakata et al. |
| 8,454,259 B2 | 6/2013 | Oetlinger |
| 8,465,242 B2 | 6/2013 | Arendt et al. |
| 8,511,929 B2 | 8/2013 | Raye et al. |
| 8,523,923 B2 | 9/2013 | Thomke et al. |
| 8,567,030 B2 | 10/2013 | Koch et al. |
| 8,596,009 B2 | 12/2013 | Baxter et al. |
| 8,661,765 B2 | 3/2014 | Schaefer et al. |
| 8,662,455 B2 | 3/2014 | Hernandez et al. |
| 8,695,296 B2 | 4/2014 | Bergman |
| D728,753 S | 5/2015 | Hikoyama |
| 9,187,898 B1 | 11/2015 | Underkofler et al. |
| 9,194,418 B2 | 11/2015 | Parthibhan et al. |
| 9,249,994 B2 | 2/2016 | Zuritis |
| 2002/0000498 A1 | 1/2002 | Workman |
| 2002/0060280 A1 | 5/2002 | Yaphe et al. |
| 2002/0110435 A1 | 8/2002 | Herb et al. |
| 2002/0122691 A1 | 9/2002 | Wood |
| 2003/0042033 A1 | 3/2003 | Herb et al. |
| 2003/0043033 A1 | 3/2003 | Lee |
| 2003/0063961 A1 | 4/2003 | Lay |
| 2003/0122044 A1 | 7/2003 | Unverzagt et al. |
| 2003/0159397 A1 | 8/2003 | Birnbaum |
| 2003/0185643 A1 * | 10/2003 | Thompson ............ F16B 37/046 411/85 |
| 2004/0165943 A1 | 8/2004 | Herb |
| 2004/0165947 A1 | 8/2004 | Herb |
| 2004/0165965 A1 | 8/2004 | Unverzagt et al. |
| 2004/0228681 A1 | 11/2004 | Herb |
| 2005/0116123 A1 | 6/2005 | Bailey et al. |
| 2005/0129458 A1 | 6/2005 | Hoffmann |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |
| 2007/0248793 A1 | 10/2007 | Herb et al. |
| 2008/0217490 A1 | 9/2008 | Bucciferro et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1 | 5/2012 | Chen |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2013/0047541 A1 | 2/2013 | Mayer |
| 2014/0042286 A1 | 2/2014 | Jaffari |
| 2014/0091050 A1 | 4/2014 | Zhang |
| 2014/0093307 A1 | 4/2014 | Zhang |
| 2014/0097304 A1 | 4/2014 | Mastro |
| 2014/0197284 A1 | 7/2014 | Hikoyama |
| 2014/0283475 A1 | 9/2014 | Zhang et al. |
| 2015/0276092 A1 | 10/2015 | Oliver et al. |
| 2015/0322669 A1 | 11/2015 | Shih |

FOREIGN PATENT DOCUMENTS

| | | |
|---|---|---|
| DE | 8232700 U1 | 6/1983 |
| DE | 3513382 A1 | 10/1986 |
| DE | 8704502 U1 | 7/1987 |
| DE | 102006035405 A1 | 5/2008 |
| DE | 202010004406 U1 | 7/2010 |
| DE | 102009000603 A1 | 9/2010 |
| DE | 20 2012 102 394 U1 | 9/2012 |
| EP | 0592743 A1 | 4/1994 |
| GB | 569377 | 5/1945 |
| GB | 687403 | 2/1953 |
| GB | 1157545 | 7/1969 |
| GB | 1370645 | 10/1974 |
| JP | 2000139583 | 5/2000 |
| WO | 9837349 A1 | 8/1998 |
| WO | 2013125821 A1 | 8/2013 |
| WO | 2014159372 A1 | 10/2014 |

OTHER PUBLICATIONS

Hilti MI/MZ Technical Guide, 4.2 MQ System Components—Load Data and Material Specifications, MQM Wing Nut, (at least as early as Mar. 13, 2012), 1 page, www.us.hilti.com, Canada.

UNISTRUT, P10008 & P1001 Channels, (at least as early as Mar. 13, 2012), 1 page.

UNISTRUT, P1100® & P1101 Channels, (at least as early as Mar. 13, 2012), 1 page.

UNISTRUT, P2000® & P2001 Channels, (at least as early as Mar. 13, 2012), 1 page.

UNISTRUT, Channels Nuts, Top Retainer Nut, (at least as early as Mar. 13, 2012), 1 page.

Power-Strut Engineering Catalog, Pictorial Table of Contents, (at least as early as Mar. 13, 2012), pp. 11-14, www.alliedeg.

B-Line by EATON—Channel Nuts & Hardware, Strut Systems, (at least as early as Mar. 13, 2012), pp. 45-53.

Power-Strut Engineering Catalog, Tyco International. 2008, retrieved on Jan. 5, 2016, http://www.power-strut.com/DB/PDF1/Power-Strut-Catalog_2008.pdf, pp. 63, 65.

Unistrut General Engineering Catalog. Catalog [online]. Unistrut Corporation. Mar. 1, 1998, retrieved on Jan. 5, 2016, http://www.unistrut.us/DB/PDF_Archive/No_12.pdf, pp. 117, 118.

A guide to threadlocking adhesives, Reliable Plant, May 28, 2013, (online), retrieved on Apr. 27, 2017, retrieved from the internet, https://web.archive.org/web/20130528020650/http:www.reliableplant.com/Read/27159/Guide-to-threadlooking-adhesives.

* cited by examiner

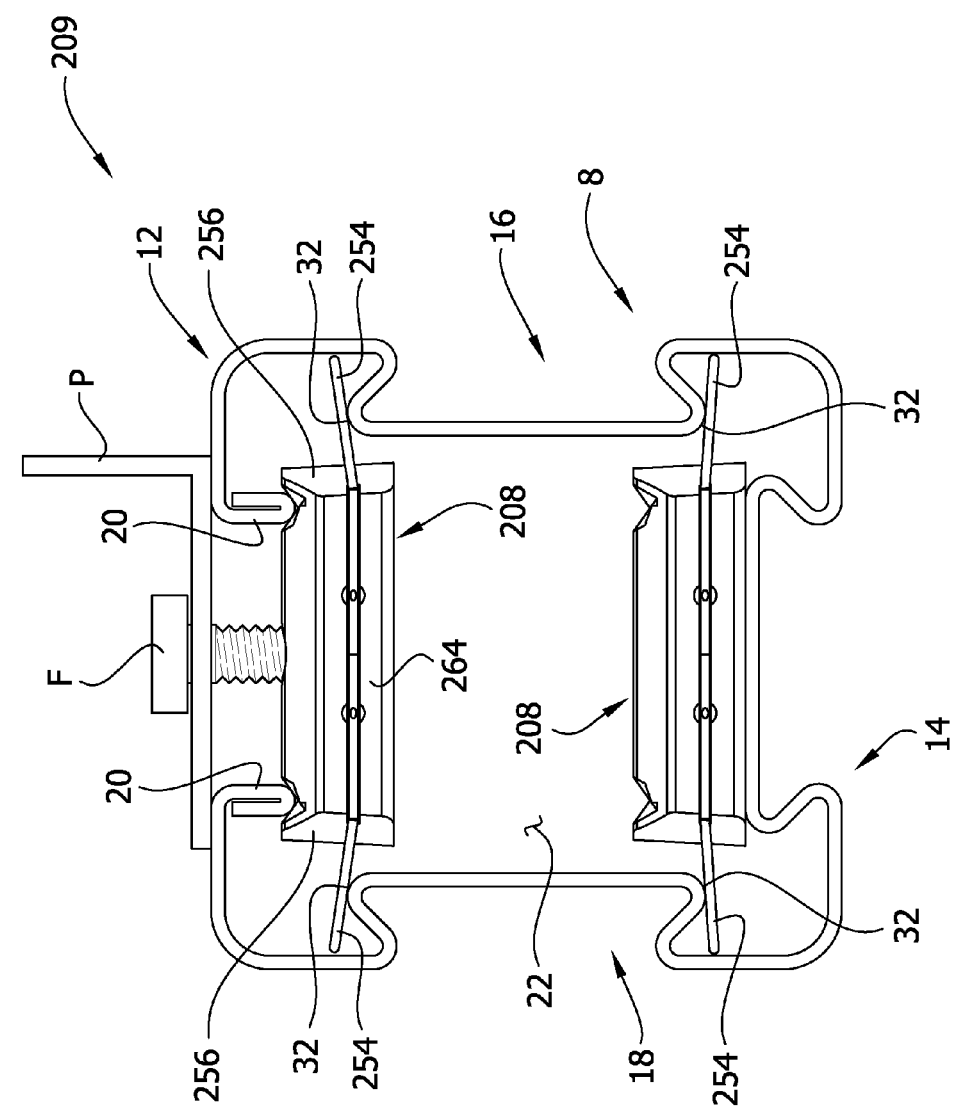

FASTENER NUT FOR CHANNEL FRAMING

FIELD OF THE DISCLOSURE

The present invention generally relates to a fastener nut for channel framing, and a channel framing assembly including the fastener nut.

BACKGROUND

One type of channel framing is called strut channel, which is used in the construction and electrical industries for structural support, often for supporting wiring, plumbing, or mechanical components such as air conditioning or ventilation systems. Strut channel is usually formed from metal sheet, folded over to define an open channel with interned lips to provide additional stiffness and as a location to mount interconnecting components. A fastener nut may be inserted into the interior of the channel framing, in opposing relationship to the open channel, for use in securing a part to the open channel side of the strut channel. The side of the strut channel opposite the open channel usually has holes of some sort in the base, to facilitate interconnection or fastening strut to underlying building structures.

SUMMARY OF THE DISCLOSURE

In one aspect, a fastener nut for securing a part to channel framing having a length and an open interior defining at least one internal, generally T-shaped track extending lengthwise of the channel framing is disclosed. The fastener nut includes a nut body having a top, a bottom, opposite first and second longitudinal ends, opposite sides extending between the opposite longitudinal ends. A fastener opening extends from the top toward the bottom for receiving a fastener for securing the part to the channel framing, and a length extending between the opposite first and second longitudinal ends. First and second wings of the fastener nut extend longitudinally outward from the respective first and second longitudinal ends of the body. The first and second wings have respective terminal ends defining an effective wing span therebetween that is greater than the length of the body such that at least a portion of the fastener nut has a generally T-shaped side profile. The fastener nut is insertable in the generally T-shaped track of the channel framing to allow the fastener nut to slide along the length of the channel framing and to restrict transverse movement of the fastener nut in the interior, relative to length of the framing, for use in positioning the fastener nut along the channel framing.

In another aspect, channel framing assembly generally includes channel framing having a length and an open interior defining at least one internal, generally T-shaped track extending lengthwise of the channel framing, and a fastener nut for securing a part to the channel framing. The fastener nut includes a nut body having a top, a bottom, opposite first and second longitudinal ends, opposite sides extending between the opposite longitudinal ends, a fastener opening extending from the top toward the bottom for receiving a fastener for securing the part to the channel framing, and a length extending between the opposite first and second longitudinal ends. First and second wings extend longitudinally outward from the respective first and second longitudinal ends of the body. The first and second wings having respective terminal ends defining an effective wing span therebetween that is greater than the length of the body such that at least a portion of the fastener nut has a generally T-shaped side profile. The fastener nut is insertable in the generally T-shaped track of the channel framing to allow the fastener nut to slide along the length of the channel framing and to restrict transverse movement of the fastener nut in the interior, relative to length of the framing, for use in positioning the fastener nut along the channel framing.

In yet another aspect, a method of assembling a channel framing assembly generally comprises inserting a fastener nut in a generally T-shaped track defined by an interior of channel framing. The fastener nut includes: a nut body having a top, a bottom, opposite first and second longitudinal ends, opposite sides extending between the opposite longitudinal ends, a fastener opening extending from the top toward the bottom for receiving a fastener for securing a part to the channel framing, and a length extending between the opposite first and second longitudinal ends; and first and second wings extending longitudinally outward from the respective first and second longitudinal ends of the body, the first and second wings having respective terminal ends defining an effective wing span therebetween that is greater than the length of the body such that at least a portion of the fastener nut has a generally T-shaped side profile. A part is secured to an exterior of the channel framing using the fastener nut.

Other features will be in part apparent and in part pointed out hereinafter.

BRIEF DESCRIPTION OF THE DRAWINGS

FIG. 19A is a front elevation of a third embodiment of a channel framing assembly including a plurality of the third nuts;

Corresponding reference characters indicate corresponding parts throughout the drawings.

DETAILED DESCRIPTION

Figure 1:
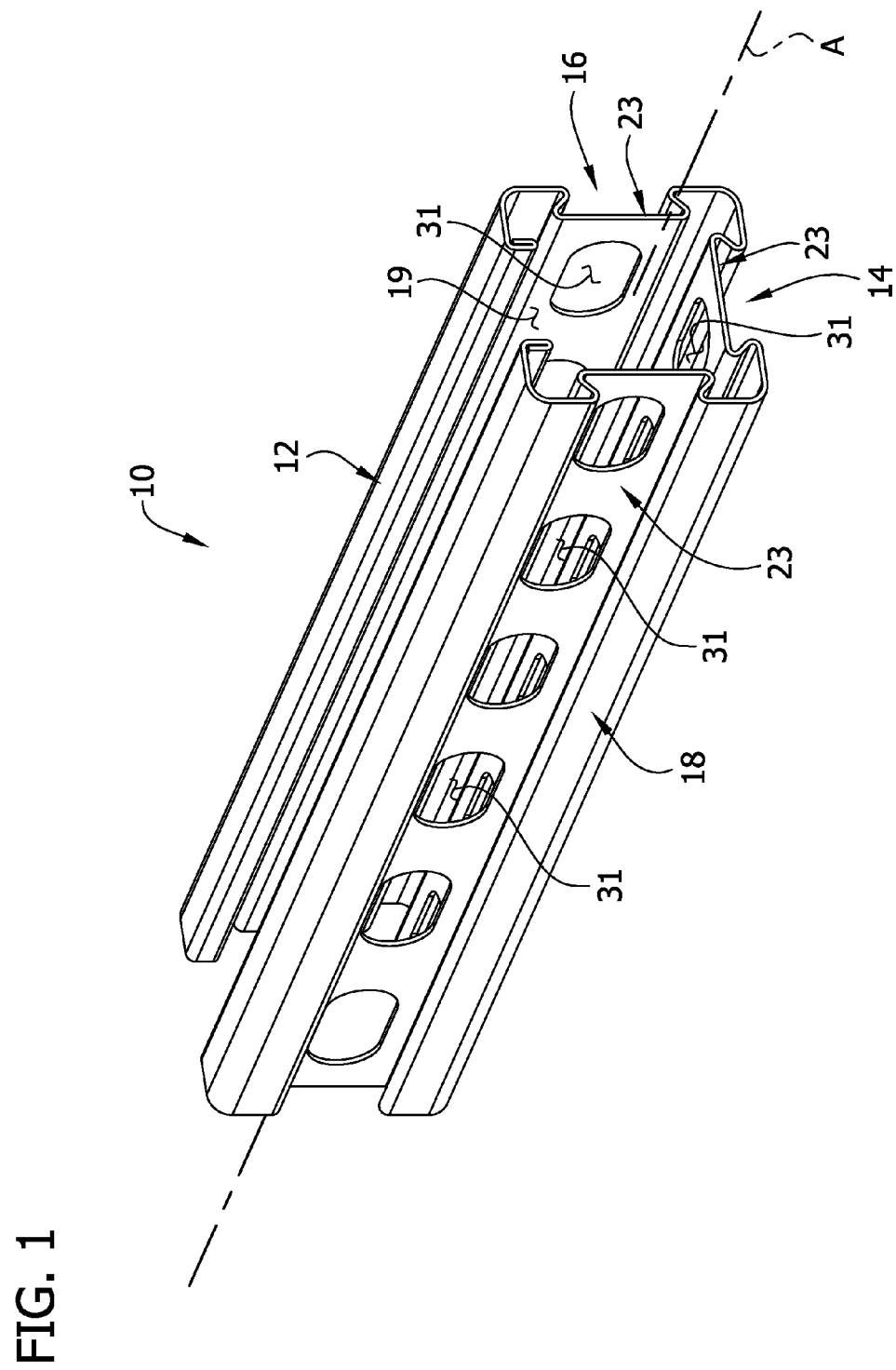
FIG. 1 is a front perspective of one embodiment of channel framing for use in a channel framing assembly.

The present disclosure is directed to a fastener nut for channel framing, one embodiment of which is indicated generally at reference numeral 8 in FIGS. 4-9. The disclosure is also directed to a channel framing assembly 9 including the fastener nut 8 and channel framing 10 (see, e.g., FIGS. 10-11). As seen in FIG. 11, and explained in more detail below, the channel framing assembly 9 is configured for use in securing a part P (such as bracket) to the assembly. The channel framing assembly 9 may be constructed for use in many different fields, industries, and applications, including, but not limited to, safety grating industry, spring steel fastener industry, cable trays and ladders, pipe hangers, solar industry, racks and runways, electrical enclosures, seismic industry, and rooftop supports.

Figure 2:
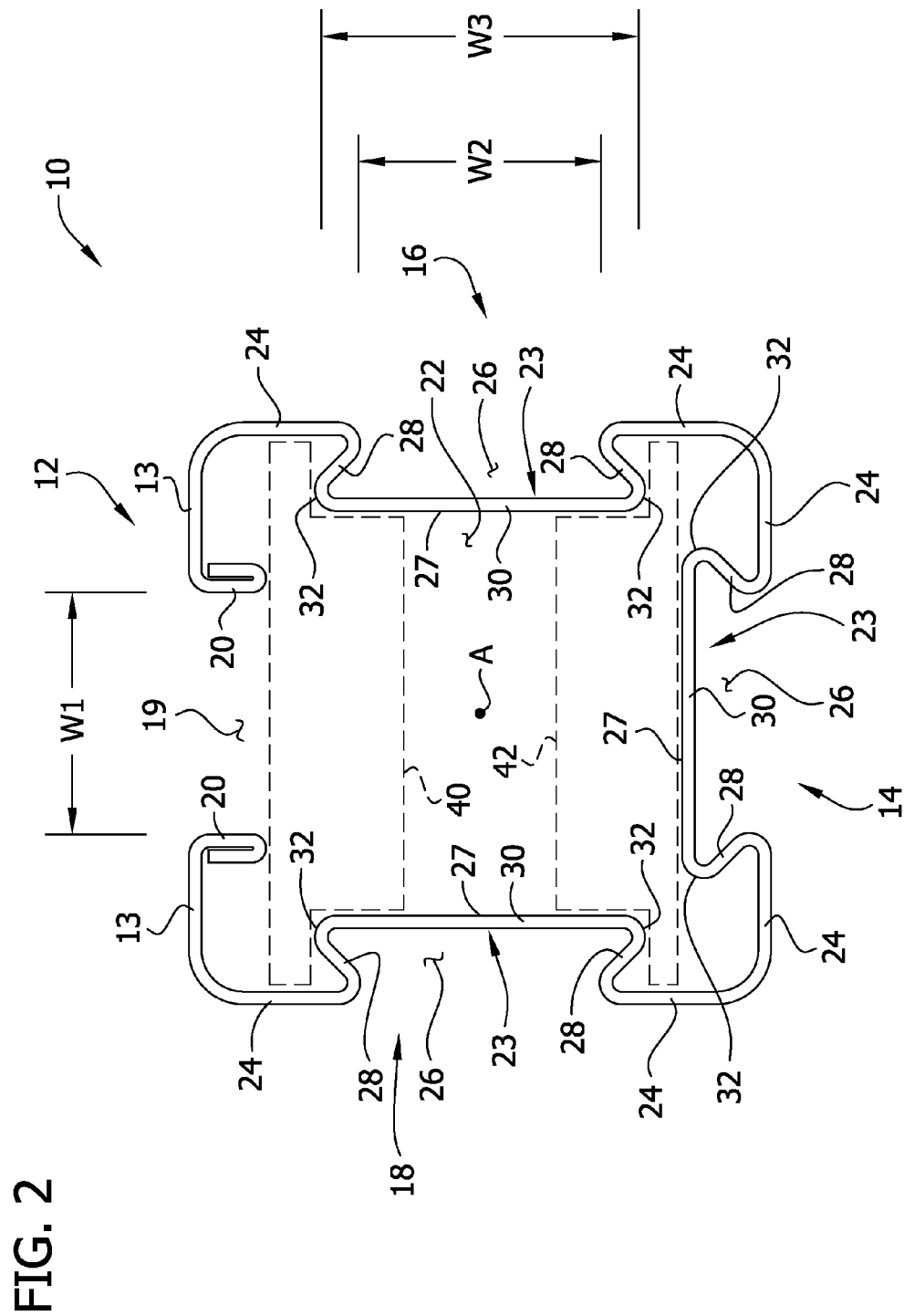
FIG. 2 is a front elevation of the channel framing, with upper and lower T-shaped tracks defined by an interior of the channel framing being shown in broken lines.
Figure 3:
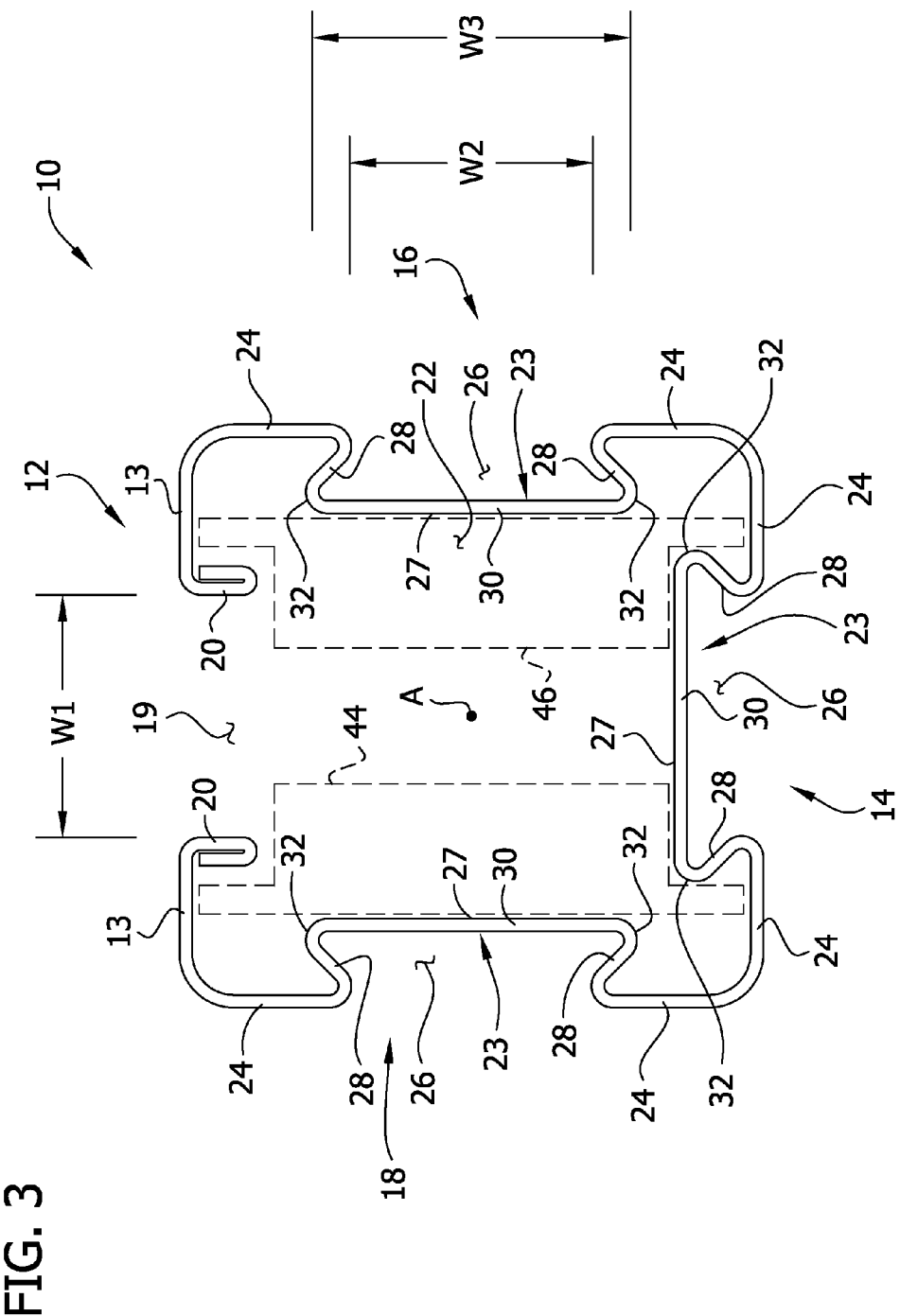
FIG. 3 is similar to FIG. 2, except with left and right T-shaped tracks defined by an interior of the channel framing being shown in broken lines.
Figure 4:
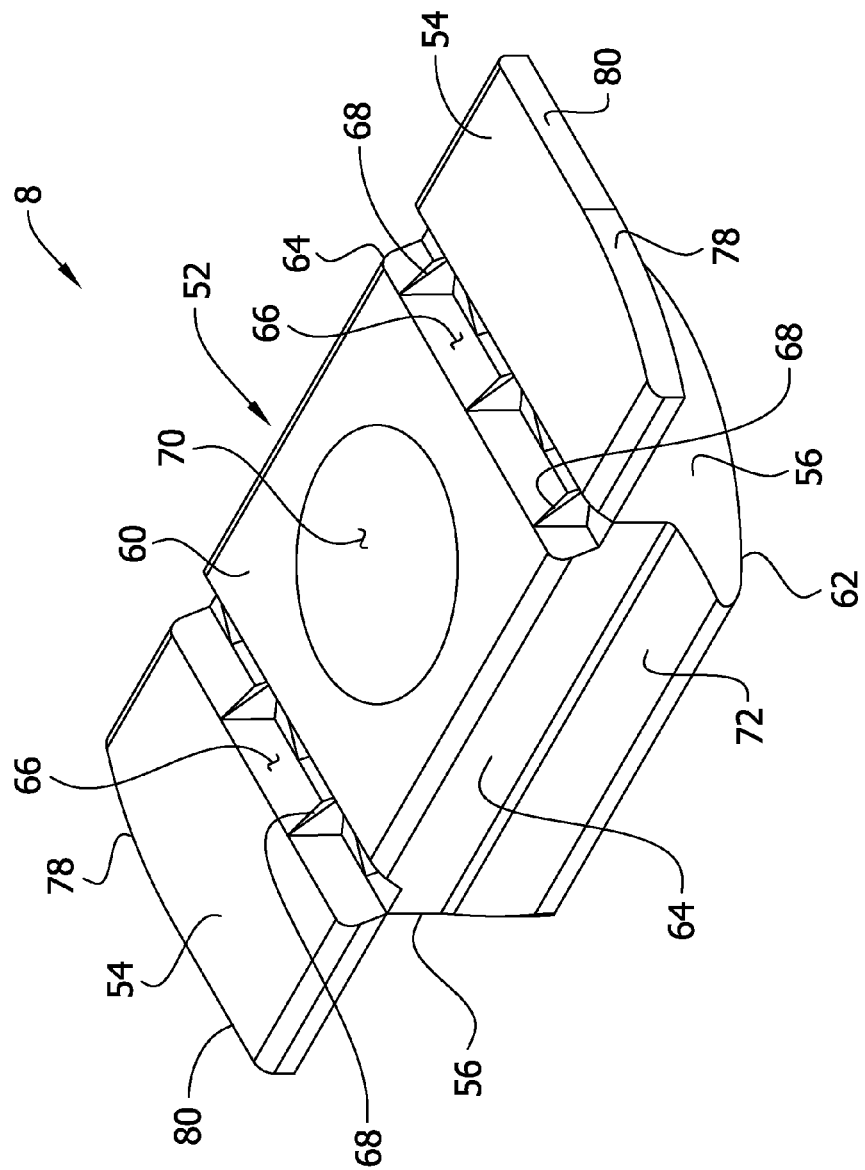
FIG. 4 is a front perspective of one embodiment of a fastener nut for use with channel framing for forming a channel framing assembly.
Figure 5:
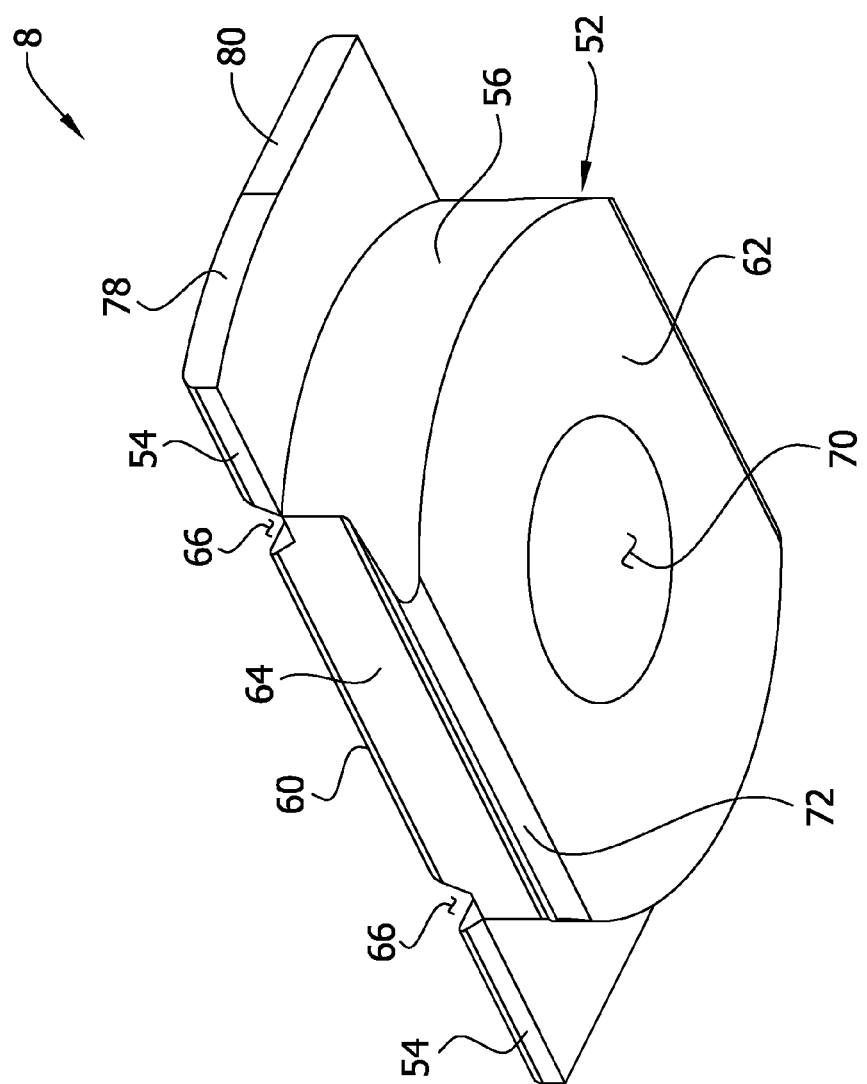
FIG. 5 is a bottom perspective of the fastener nut.
Figure 6:
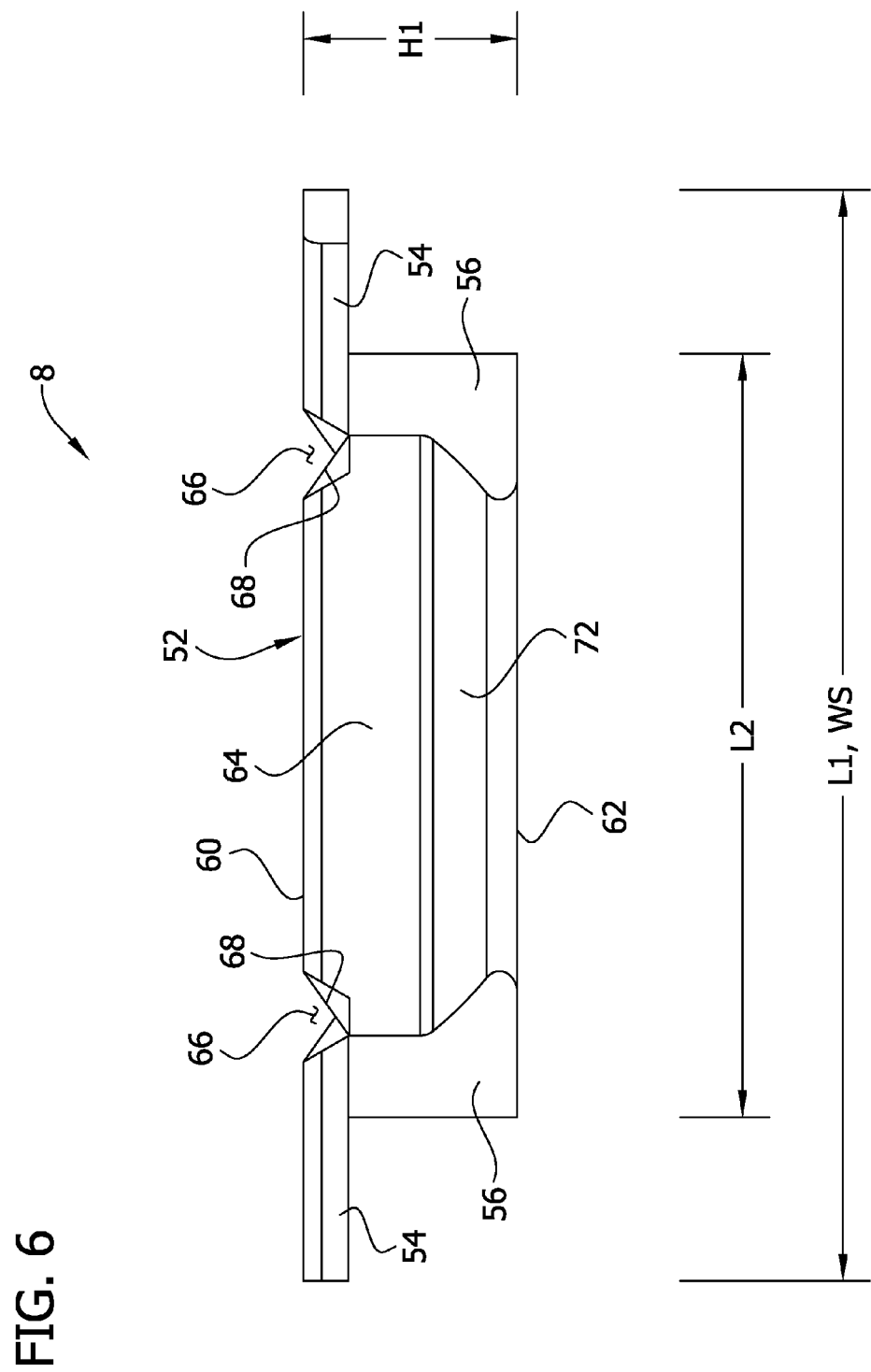
FIG. 6 is a left elevation of the fastener nut (the right elevation being identical)

Referring to FIGS. 1-3, the channel framing 10 is elongate with a generally square or rectangular cross-sectional shape having four sides and a longitudinal axis A extending along its length. As illustrated, the body 11 of the framing 10 has an upper side 12, a lower side 14, a right side 16, and a left side 18 (each indicated generally). As used throughout the present disclosure with respect to the channel framing, the terms defining relative locations and positions of structures and components of the channel framing, including but not limited to the terms "upper," "lower," "right," "left," "top," and "bottom," are meant to provide a point of reference for such components and structures as shown in the drawings, with the understanding that the respective relative locations of such components and structures will depend on the orientation of the channel framing in use. Moreover, the terms "inner" and "outer" are relative locations with respect to the longitudinal axis A of the channel framing 10. The upper side 12 (or slot side) defines a continuous opening or slot 19 (i.e., the upper side is open) having a width W1 (FIG. 2). The upper side 12 has outer portions 13 on either side of the slot 19, and inturned (or downwardly extending, as illustrated) lips 20 defining the slot and leading to an open interior 22 of the channel framing 10.

As illustrated, each of the lower, right and left sides 14, 16, 18, respectively, of the channel framing 10 has an inward portion, generally indicated at 23, and opposite outer portions 24 on either side of the inward portion, extending lengthwise of channel framing 10. An exterior of the inward portion 23 defines an external fitting groove 26, and an interior surface of the inward portion defines an internal rail 27. Thus, the illustrated channel framing 10 includes respective left, right, and lower fitting grooves 26 and corresponding left, right, and lower internal rails 27. Each inward portion 23 includes opposing side walls 28 extending generally inwardly from the respective ones of the outer portions 24 of the corresponding side 14, 16, 18. The side walls 28 extend to a planar inner wall 30 that spans between and interconnects the side walls. The side walls 28 flare away from one another as they extend inward from the outer portions 24 toward the inner wall 30 so that each inward portion 23 has a generally dovetail cross-sectional shape or longitudinal end profile. It is understood that the inner portion 23, including one or both of the fitting groove 26 and the internal rail 27, may be of other shapes and configurations without departing from the scope of the present disclosure.

In the illustrated embodiment (FIG. 1), openings 31 extend through each of the inner walls 30 of the inward portions 23 of the left, right, and lower sides 18, 16, 14, respectively. As explained in more detail below, a fastener F (e.g., a bolt) may be inserted through a selected one of the openings 31 and fastened to a channel nut 8 for securing the part P to the exterior of the channel framing 10. The openings 31 may be, for example, knockouts, or punched, or half-slots, or slots, as are generally known in the art. Typically, the openings 31 in the channel framing 10 will be the same type of opening, although the same channel framing may include a mix of different types of openings, such as shown in the illustrated embodiments. It is also understood that the sides may not include openings without departing from the scope of the present invention.

Referring to FIG. 2, the fitting grooves 26 are substantially identical to one another. Each fitting groove 26 has a generally dovetail-shaped profile with a first relatively narrower width W2 (e.g., a minimum width) adjacent its entrance and a second relatively wider width W3 (e.g., a maximum width) adjacent the inner wall 30. In the illustrated embodiment, the fitting grooves 26 are used for securing a fitting, such as the fastener nut 8, to the channel framing 10. For example, as seen in FIGS. 10-13 and explained in more detail below, the fastener nut 8 of the present disclosure may be inserted in the fitting grooves 26 for securing the part P (e.g., the bracket) to the exterior of the channel framing 10. Other types of fittings which include a coupling component that is complementary to the fitting grooves 26 (e.g., a dovetail-shaped coupling component that can be inserted into the dovetail-shaped fitting groove) can also be used with the channel framing 10.

Each rail 27 has a generally dovetail-shaped profile with opposite internal shoulders 32 at the junctions of the inner wall 30 and the side walls 28. Accordingly, the left and right rails 27 have upper and lower internal shoulders 32, as illustrated, and the lower rail 27 has left and right internal shoulders 32, as illustrated. The open interior 22 of the channel framing 10, including the rails 27, defines at least one track in which the fastener nut 8 can be inserted for use in positioning the fastener nut at a desired location along the length of the channel framing, as explained in more detail below. Referring to FIGS. 2 and 3, in the illustrated embodiment the interior of the channel framing defines four (4) separate tracks, each of which has an effective T-shape in cross section (i.e., a "T-shaped track"). FIG. 2 includes a general outline (shown in broken line) of both a first T-shaped track 40 (e.g., an upper T-shaped track), defined by the inturned lips 20, and the upper shoulders 32 and inner faces (defined by the inner walls 30) of the respective left and right internal rails; and a second T-shaped track 42 (e.g., a lower T-shaped track), defined by the lower shoulders 32 and inner faces (defined by the inner walls 30) of the respective left and right internal rails 27, and the inner face (defined by the inner wall 30) of the lower internal rail. FIG. 3 includes a general outline (shown in broken line) of both a third T-shaped track 44 (e.g., a left T-shaped track), defined by the left inturned lip 20, the inner face (defined by the inner wall 30) of the left internal rail 27, and the left shoulder and inner face (defined by the inner wall 30) of the lower internal rail; and a fourth T-shaped track 46 (e.g., a right T-shaped track) defined by the right inturned lip 20, the inner face (defined by the inner wall 30) of the right internal rail 27, and the right shoulder and inner face (defined by the inner wall 30) of the lower internal rail.

In one example, the channel framing 10 may be formed from a sheet of rigid metal, such as low carbon steel, stainless steel, aluminum, or other metals, or from other material, such as fiberglass or plastic. The channel framing 10 may be cold formed using a rolling mill, such as when forming the channel framing from steel, or the channel framing may be extruded from an extrusion die, such as when forming the channel framing from aluminum. The channel framing 10 may be formed in other ways. The channel framing 10 may be formed from a metal sheet having uniform thickness from about 0.5 mm to about 4 mm. In one non-limiting example, the channel framing 10 may be formed from 18 gauge (1.2 mm) steel sheet metal, or from 20 gauge (0.9 mm) steel sheet metal. In another non-limiting embodiment, the dimension of each of the width and height of the channel framing 10 may be 53.5 mm, as opposed to 50 mm.

Referring to FIGS. 4-9, the fastener nut 8 includes a nut body, generally indicated at 52, and opposite end extensions (e.g., integral extensions) or wings 54 extending outward from respective opposite longitudinal ends 56 (e.g., left and right ends) of the body. As used throughout the present disclosure with respect to the fastener nut 8, the terms denoting relative locations and positions of structures and components of the fastener nut, including but not limited to the terms "upper," "lower," "right," "left," "top," and "bottom," are meant to provide a point of reference for such components and structures of the fastener nut as shown in FIGS. 4-9, with the understanding that the respective relative locations of the components and structures will depend on the orientation of the fastener nut in use. In addition to the longitudinal ends 56, the nut body 52 has a top 60, a bottom 62, and opposite sides 64 extending longitudinally (i.e., along a length L1 of the fastener nut 8; e.g., FIG. 6) between the opposite longitudinal ends 56. The longitudinal ends 56 are rounded (e.g., radiused) between the opposite sides 64 to facilitate insertion and positioning of the fastener nut 8 in a selected one of the T-shaped tracks 42, 44, 46, 48 in a crosswise or transverse orientation relative to the longitudinal axis A of the channel framing 10, as explained in detail below. The top 60 of the body portion 52 defines lip-receiving grooves 66 adjacent the opposite longitudinal ends 56 of the body portion and the wings 54. The lip-receiving grooves 66 extend generally transverse to the length L1 of the fastener nut 8, and are configured for receiving the inturned lips 20 when the fastener nut is fastened within the upper T-shaped track 40 (FIG. 2). A plurality of teeth 68 are disposed in the lip-receiving grooves 66 to facilitate frictional engagement with the inturned lips 20. The bottom 62 of the nut body 52 is generally planar (e.g., flat) although it may have other contours. A threaded fastener opening 70 (e.g., a through opening) extends from the top 60 through the bottom 62 of the nut body 52, in a direction generally transverse (e.g., orthogonal) to the length L1 of the fastener nut 8. The fastener opening 70 receives a fastener F (e.g., a threaded bolt or threaded stud; e.g., FIGS. 11 and 13) associated with the part P (e.g., the bracket) for securing the part to the channel framing 8, as explained in more detail below. In another embodiment, the fastener opening 70 may be non-threaded and/or may be a blind opening, as opposed to the illustrated through opening. For example, a threaded fastener opening may extend from the top 60 toward the bottom 62 but does not extend through the bottom.

Figure 7:
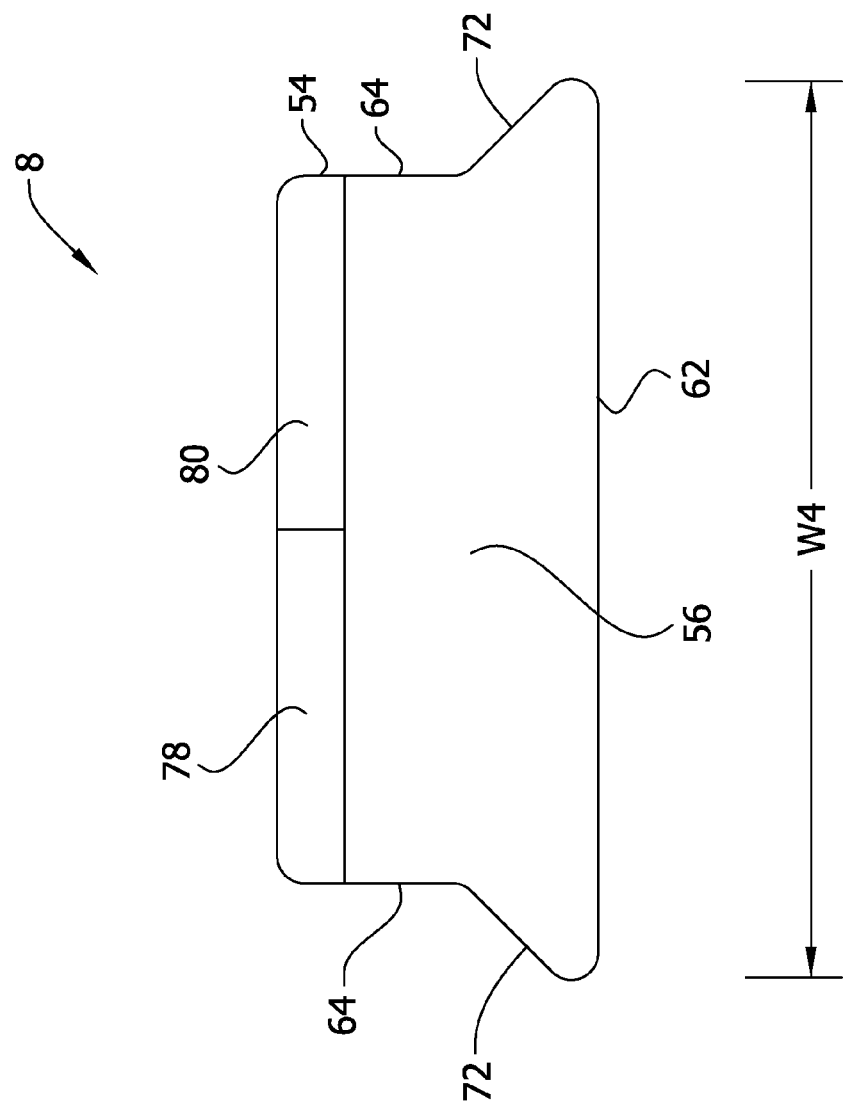
FIG. 7 is a front elevation of the fastener nut (the rear elevation being identical)
Figure 8:
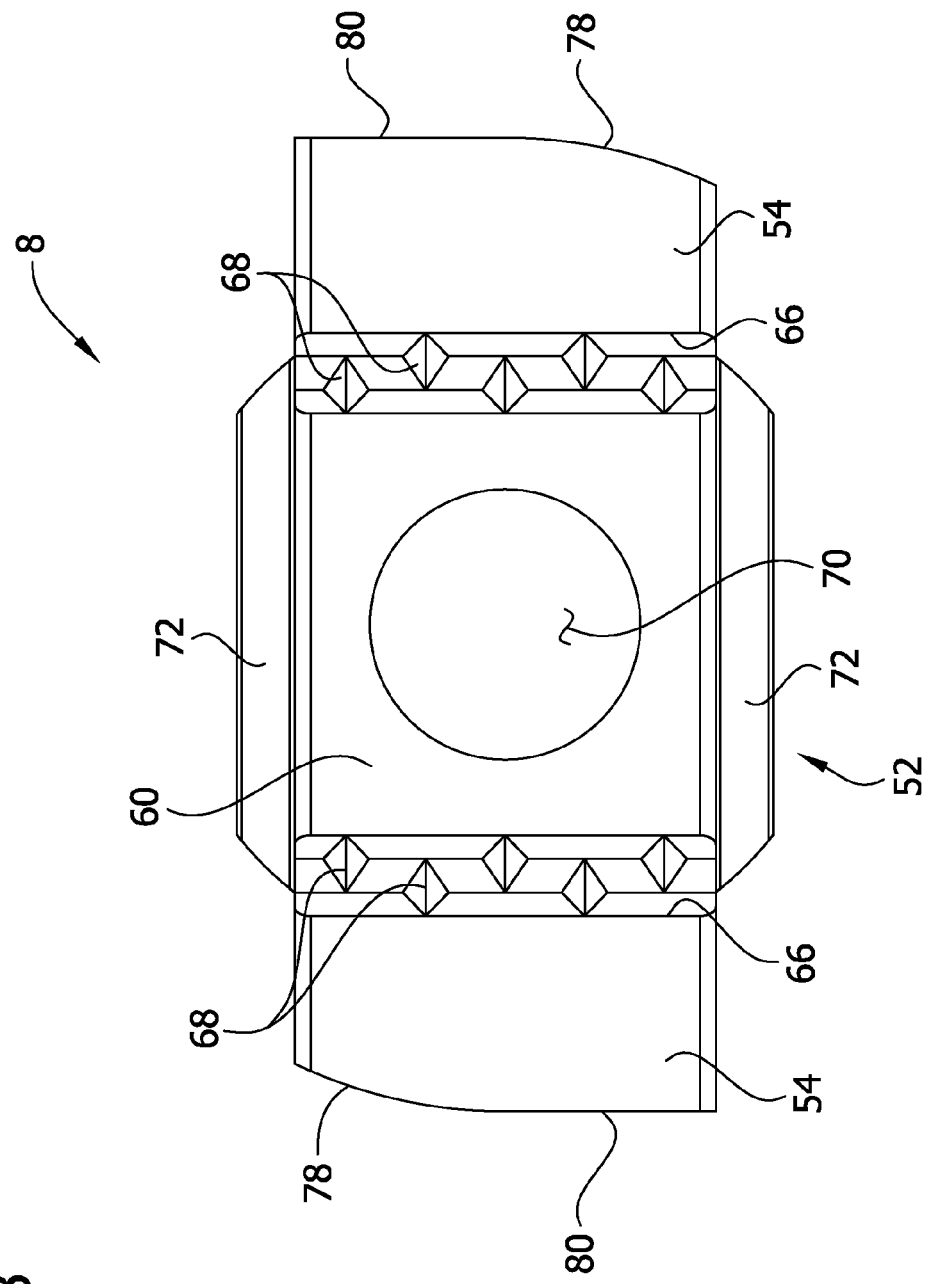
FIG. 8 is a top plan view of the fastener nut.
Figure 9:
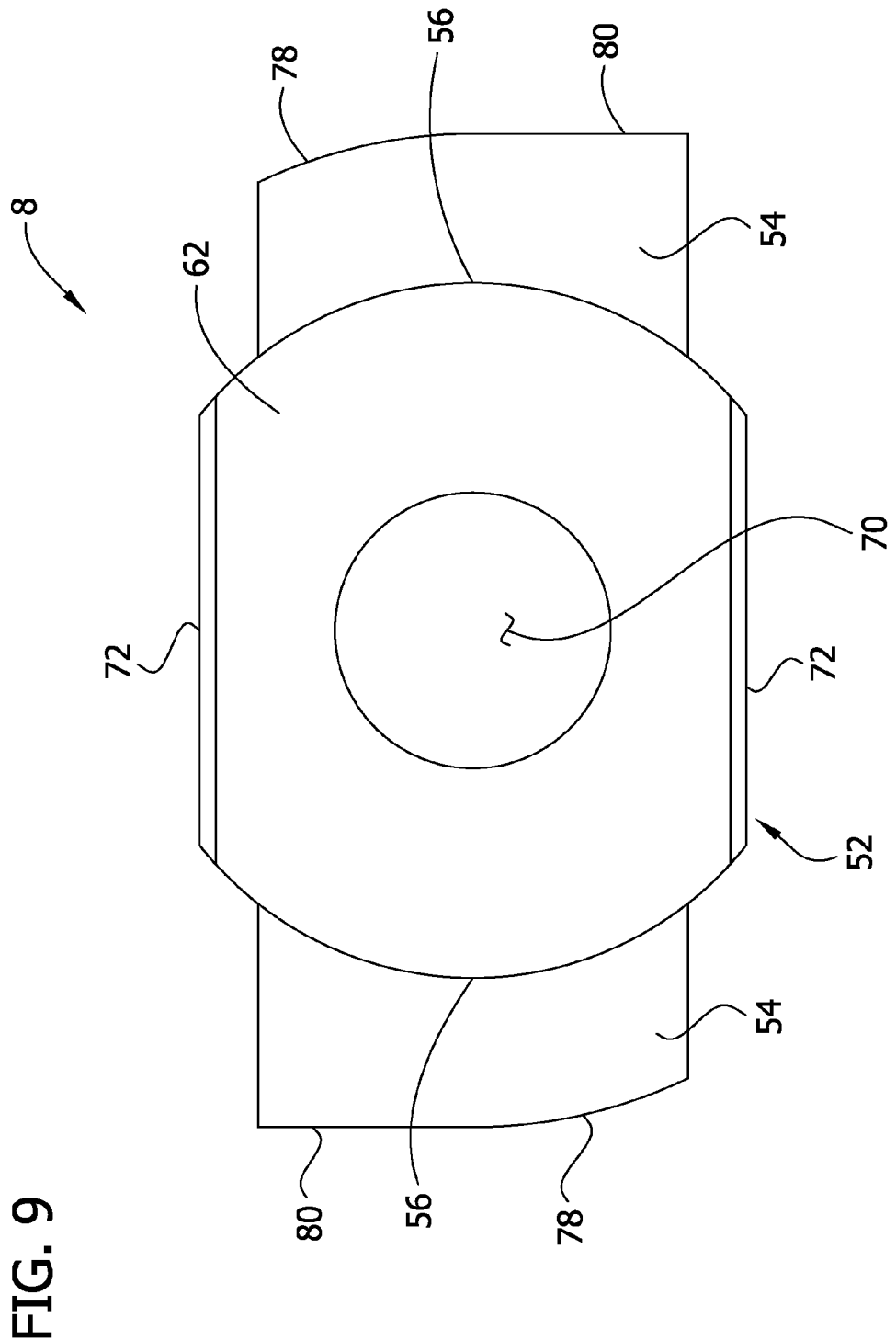
FIG. 9 is a bottom plan view of the fastener nut.
Figure 13:
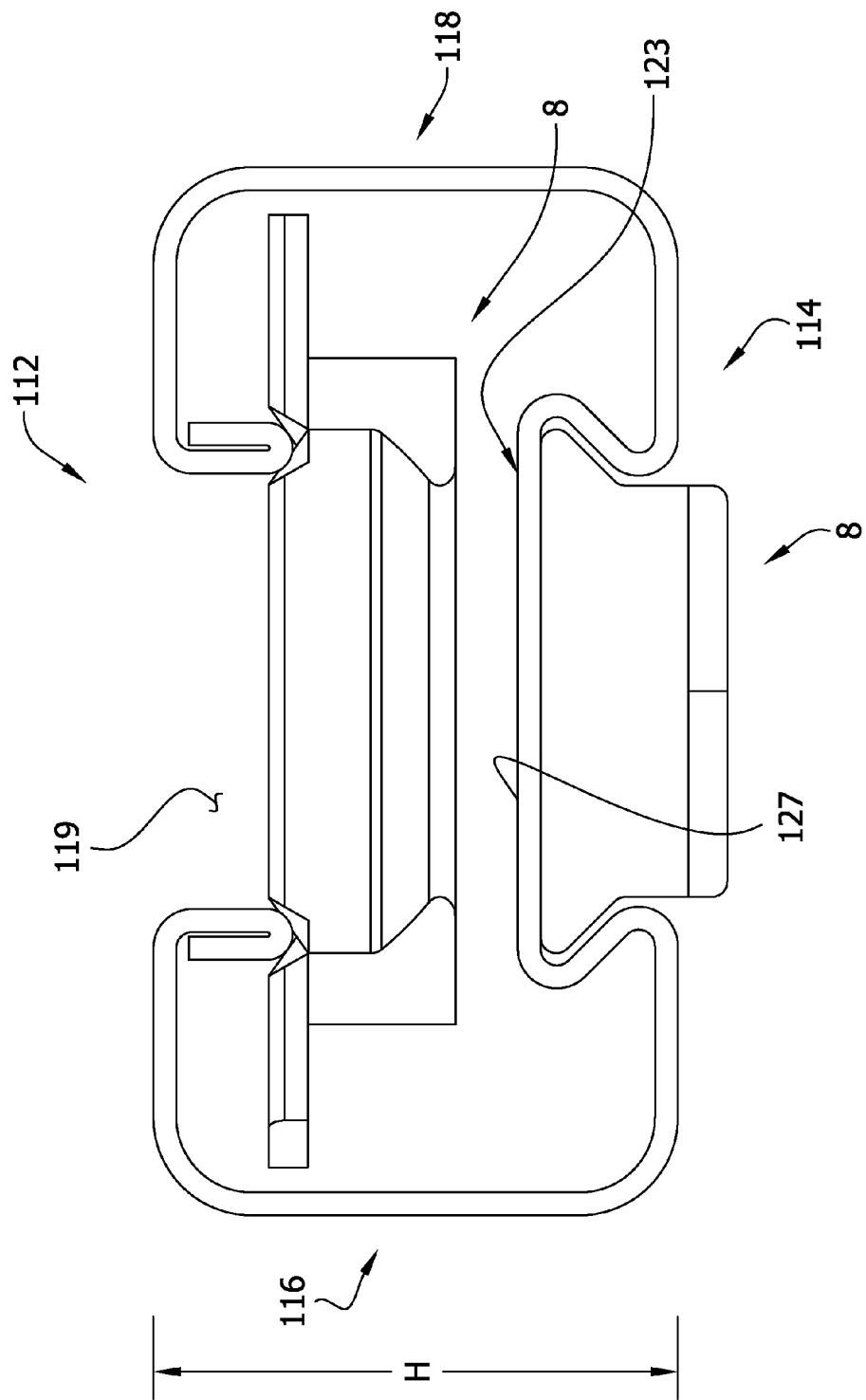
FIG. 13 is a front elevation of the channel framing assembly in FIG. 12.

Each of the sides 64 of the nut body 52 has a lower, flared portion 72 that flares outward toward the bottom 62 of the body 52 such that the sides 64 and the bottom together define a generally dovetail shape. In particular, an end profile of the body 52 (particularly, the end profile defined by the sides 64 and the bottom 62), as shown in FIG. 7, generally corresponds to the end profiles (or cross-sectional shapes) of the fitting grooves 26 defined by the channel framing 10. The body 52, in particular the flared portion 72, is sized so that it is capable of being slidingly received and captured in the grooves 26, as shown in FIGS. 11 and 13, through the open longitudinal ends of the grooves. Once the body portion 52 is received in the groove 26, the fastener nut 8 can slide longitudinally within the groove, but the fastener nut is inhibited from being withdrawn from the groove in a direction transverse from the longitudinal axis A of the channel framing. Thus, the fastener nut 8 can be positioned at a desired longitudinal location on the exterior of the channel framing 10 by sliding the fastener nut lengthwise of the channel framing within the groove 26. In the illustrated embodiment, the fastener nut 8 has a maximum width W4 at the dovetail portion of the nut body 52 that is less than the width W1 of the slot 19 in the upper side 12 of the channel framing 10 so that the fastener nut can be inserted through the slot and into the interior 22 of the channel framing, as explained in more detail below. The fastener nut 8 also has a height H1 extending between the top 60 and the bottom 62 of the nut body 52.

The wings 54 extend longitudinally outward from respective longitudinal ends 56 of the nut body 52 adjacent the top 60 of the nut body. In the illustrated embodiment, the wings 54 comprise flanges having generally planar upper surfaces that are generally coplanar (i.e., flush) with the top 60 of the nut body. In other embodiments, the wings 54 may have other shapes and configurations. The wings 54 have respective terminal ends and together the wings define an effective wing span WS extending between the terminal ends of the wings, which in the illustrated embodiment is the same as the length L1 of the fastener nut 8. The effective wing span WS is greater than a length L2 of the nut body 52 such that at least a portion of the fastener nut 8 has a generally T-shaped side profile. In the illustrated embodiment the entirety of the fastener nut 8 has a generally T-shaped profile, although it is contemplated that the fastener nut may have a cross-shaped profile where the top 60 of the nut body 52 extends above the wings 54. In this cross-shaped profile, a portion of the fastener nut (i.e., the portion of the fastener nut below the plane defined by the upper surface of the wings) has a T-shaped profile. Diagonally-opposite rounded portions 78 of the terminal ends of the wings 54 are rounded (radiused) widthwise of the wings so that the terminal ends of the wings fall off toward diagonally-opposite corners of the wings. These diagonally-opposite rounded portions 78 facilitate insertion of the wings 54 into the respective T-shaped tracks 40, 42, 44, 46 as the fastener nut 8 is rotated to a position that is generally traverse or crosswise relative to the longitudinal axis A of the channel framing 10. Remaining portions 80 of the terminal ends of the wings 54 are substantially squared off to inhibit over rotation of the fastener nut 8 in the T-shaped tracks 40, 42, 44, 46.

In the illustrated embodiment, the wings 54 are formed integrally with the nut body, although it is contemplated that the wings may be formed separately and then fastened to the nut body. For example, the fastener nut 8 may be formed by a stamping operation or other suitable operation. The fastener nut 8 may be formed from metal, such as a zinc-coated, heat treated, AISI 1018 steel having a Rockwell hardness of 30-50 C and more preferably 40-45 C. Other materials may be used. It is also contemplated that the wings may be formed separate from the nut body and then secured to the nut body, such as by fastener(s), welding, or in other ways. For example, the wings may be a single, integrally-formed, monolithic component, or the wings may be formed separately as individual components.

In one example, to insert the fastener nut 8 into the upper T-shaped track 40 of the channel framing 10 (as shown in FIG. 11), the fastener nut may be inserted through the slot 19 so that the length L1 of the fastener nut runs along the length of the slot and the bottom 62 of the nut body 52 faces the lower side 14 of the channel framing. Once the fastener nut 8 is in the interior 22 of the channel framing 10 (e.g., once the wings 54 pass by the inturned lips 20), the fastener nut may be rotated 90 degrees (or a quarter turn) so that the wings move past (e.g., laterally beyond) the upper shoulders 32 of the respective left and right rails 27 and become orientated generally crosswise or transverse to the length of the channel framing. As the fastener nut 8 is rotating, the rounded portions 78 of the terminal ends of the wings 54 enter the lateral portions of the upper T-shaped track 40 first, and the diagonally-opposite corners at the squared off portions 80 of the terminal ends inhibit rotation more than about 90 degrees. Alternatively, the fastener nut 8 may be orientated such that its length L1 (and wingspan WS) is generally crosswise or transverse to the length of the channel framing 10, and then the fastener nut may be inserted directly into the upper T-shaped track 40 through one of the open longitudinal ends of the channel framing. The fastener nut 8 may be inserted into the upper T-shaped track in other ways. With the fastener nut 8 properly inserted in the upper T-shaped track 40, the fastener nut may be slid within the T-shaped track to a desired location along the length of the channel framing 10, while remaining slidingly captured between the inturned lips 20 and the upper shoulders 32 of the respective left and right internal rails 27. More than one fastener nut 8 can be inserted into the upper T-shaped track 40, and both the upper and the lower T-shaped tracks 40, 42 may concurrently have fastener nuts therein.

In one example, to insert the fastener nut 8 into the lower T-shaped track 42, the fastener nut may be inserted through the slot 19 so that the length L1 of the fastener nut runs along the length of the slot and the top 60 of the nut body 52 faces the lower side 14 of the channel framing 10 (i.e., the fastener nut is upside down). With the top 60 of the fastener nut 8 resting on the inner, planar portion of the lower rail 27 or once the wings 54 pass by or clear the lower shoulders 32 of the left and right rails, the fastener nut may be rotated 90 degrees (or a quarter turn) so that the wings move past (e.g., laterally beyond) the lower shoulders 32 of the respective left and right rails 27 and become orientated generally crosswise or transverse to the length of the channel framing 10. As the fastener nut 8 is rotating, the rounded portions 78 of the terminal ends of the wings 54 enter the lateral portions of the lower T-shaped track 42 first, and the diagonally-opposite corners at the squared off portions 80 of the terminal ends inhibit rotation of the fastener nut more than about 90 degrees (i.e., the corners at the squared off portions 80 engage the outer portions 24 of the sides 16, 18 within the interior 22 if the fastener nut is over-rotated). In an alternative method of inserting the fastener nut 8, the fastener nut may first be orientated such that its length L1 is generally crosswise or transverse to the length of the channel framing 10 and inserted directly into the lower T-shaped channel 42 through one of the open longitudinal ends of the channel framing. The fastener nut 8 may be inserted into the lower T-shaped track in other ways. With the fastener nut properly inserted in the lower T-shaped track 42, the fastener nut may be slid within the T-shaped track to a desired location along the length of the channel framing 10, while remaining slidingly captured between the lower shoulders 32 of the respective left and right internal rails 27 and the lower rail. More than one fastener nut 8 can be inserted into the lower T-shaped track 42, and both the upper and the lower T-shaped tracks 40, 42 may concurrently have fastener nuts therein.

In one example, to insert the fastener nut into the left T-shaped track 44, the fastener nut 8 may be oriented sideways and inserted through the slot 19 so that the top 60 of the nut body 52 generally faces the left side 18 of the channel framing 10. The fastener nut 8 is moved laterally within the interior 22 toward the left internal rail 27 of the channel framing 10, and once the wings 54 pass by or clear the left inturned lip 20 and the left shoulder 32 of the lower internal rail (or once the top 60 of the fastener nut 8 engages the left rail 27), the fastener nut may be rotated 90 degrees (or a quarter turn) so that the wings move past (e.g., laterally beyond) the left inturned lip 20 and the left shoulder 32 of the lower rail 27 and become orientated generally crosswise or transverse to the length of the channel framing 10. As the fastener nut 8 is rotating, the rounded portions 78 of the terminal ends of the wings 54 enter the lateral portions of the left T-shaped track 44 first, and the diagonally-opposite corners at the squared off portions 80 of the terminal ends inhibit rotation of the fastener nut more than about 90 degrees (i.e., the corners at the squared off portions 80 engage the outer portions 24 of the upper and lower sides 12, 14 within the interior 22 if the fastener nut is over-rotated). In an alternative method of inserting the fastener nut 8, the fastener nut may be orientated such that its length is generally crosswise or transverse to the length of the channel framing 10 and then inserted directly into the left T-shaped channel 44 through one of the open longitudinal ends of the channel framing. The fastener nut 8 may be inserted into the left T-shaped track 44 in other ways. With the fastener nut properly inserted in the left T-shaped track 44, the fastener nut may be slid within the T-shaped track to a desired location along the length of the channel framing 10, while remaining slidingly captured between the left inturned lip 20 and the left shoulder 32 of the lower rail 27. More than one fastener nut 8 can be inserted into the left T-shaped track 44, and both the right and left T-shaped tracks may concurrently have fastener nuts therein.

In one example, to insert the fastener nut into the right T-shaped track 46, the fastener nut 8 may be oriented sideways and inserted through the slot 19 so that the top 60 of the nut body 52 generally faces the right side 16 of the channel framing 10. The fastener nut 8 is moved laterally within the interior 22 toward the right internal rail 27 of the channel framing 10, and once the wings 54 pass by or clear the right inturned lip 20 and the right shoulder 32 of the lower internal rail (or once the top 60 of the fastener nut 8 engages the right rail 27), the fastener nut may be rotated 90 degrees (or a quarter turn) so that the wings move past (e.g., laterally beyond) the right inturned lip 20 and the right shoulder 32 of the lower rail 27 and become orientated generally crosswise or transverse to the length of the channel framing 10. As the fastener nut 8 is rotating, the rounded portions 78 of the terminal ends of the wings 54 enter the lateral portions of the right T-shaped track 46 first, and the diagonally-opposite corners at the squared off portions 80 of the terminal ends inhibit rotation of the fastener nut more than about 90 degrees (i.e., the corners at the squared off portions 80 engage the outer portions 13, 24 of the upper and lower sides 12, 14 within the interior 22 if the fastener nut is over-rotated). In an alternative method of inserting the fastener nut 8, the fastener nut may be orientated such that its length is generally crosswise or transverse to the length of the channel framing 10 and then inserted directly into the right T-shaped channel 46 through one of the open longitudinal ends of the channel framing. The fastener nut 8 may be inserted into the right T-shaped track 46 in other ways. With the fastener nut 8 properly inserted in the right T-shaped track 46, the fastener nut may be slid within the T-shaped track to a desired location along the length of the channel framing 10, while remaining slidingly captured between the right inturned lip 20 and the right shoulder 32 of the lower rail 27. More than one fastener nut 8 can be inserted into the right T-shaped track 46, and both the right and left T-shaped tracks 46, 44 may concurrently have fastener nuts therein.

In one embodiment of a method of assembling a channel framing assembly 9, at least one fastener nut 8 is inserted into one or more of the T-shaped tracks 40, 42, 44, 46 defined by the interior 22 of the channel framing 10, and slidingly captured therein such that each fastener nut can be slid lengthwise of the channel framing but is inhibited from being removed from the T-shaped track in a direction that is generally transverse to the longitudinal axis A (or length) of the channel framing. As described above, the fastener nut(s) 8 can be inserted through the slot 19 in the upper side 12 of the channel framing 10, or the fastener nut(s) can be inserted through one or both of the open longitudinal ends of the channel framing. As also described above, the fastener nut 8 may be slid along the selected T-shaped track 40, 42, 44, 46 to a desired location along the length of the channel framing 10. If the fastener nut 8 is inserted in one of the left, right, and lower T-shaped tracks 44, 46, 42, respectively, the fastener opening 70 in the fastener nut is aligned with one of the openings 31 in the respective one of the left, right, and lower sides 18, 16, 14, respectively, of the channel framing 10. If the fastener nut 8 is inserted in the upper T-shaped track 40, the continuous slot 19 allows the fastener nut to be positioned at any location along the length of the channel framing 10.

With the fastener nut 8 in the desired location along the length of the channel framing 10, the part P (e.g., bracket) is secured on the exterior of the channel framing by inserting the fastener F (e.g., a bolt or stud) associated with the part through the selected opening 19, 31 in the channel framing (e.g., the slot or an aligned opening in the left, right, or lower side 18, 16, 14, respectively) and into the fastener opening 70 in the fastener nut. For example, the fastener F may be threaded into the fastener opening 70, where the fastener and the fastener openings are mateably threaded. As the fastener F is threaded into the fastener opening 70 of the fastener nut 8 (e.g., as the fastener is tightened), the fastener nut becomes fastened to the interior 22 of the channel framing 10 (e.g., the fastener nut frictionally engages the interior of the channel framing to inhibit sliding movement of the fastener nut and the part along the length of the channel framing) and the part P is clamped onto (e.g., secured to) the exterior of the respective side 12, 14, 16, 18 of the channel framing. As seen in FIG. 11, when the fastener nut 8 is inserted in the upper T-shaped track 40 and fastened to the channel framing 10, the inturned lips 20 are received in the transverse grooves 66 and the teeth 68 in the grooves provide additional friction and grip to further inhibit sliding movement of the fastener nut fastener relative to the length of the channel framing.

Figure 10:
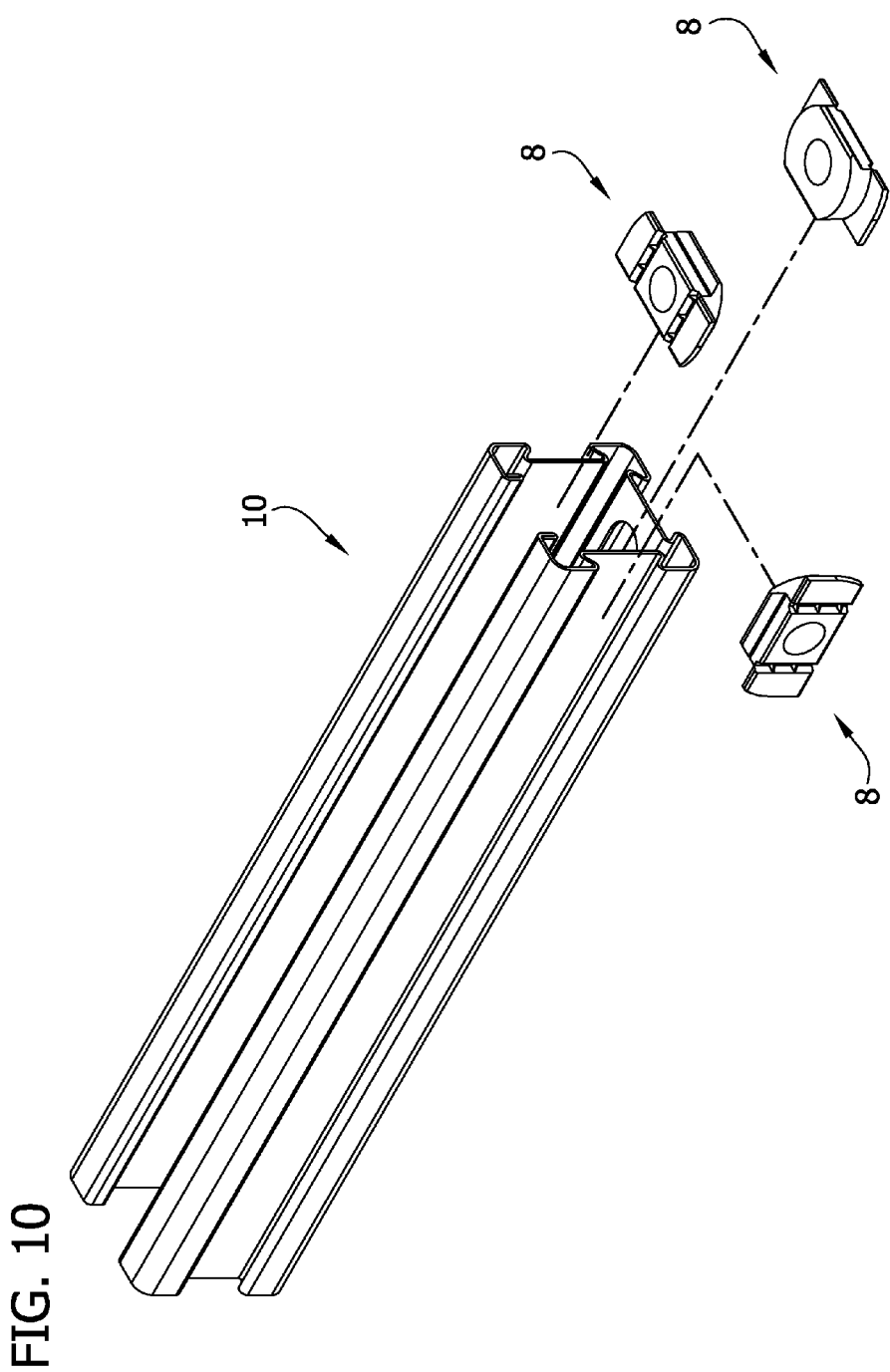
FIG. 10 is an exploded view of one embodiment of a channel framing assembly including a plurality of the fastener nuts and the channel framing.
Figure 11:
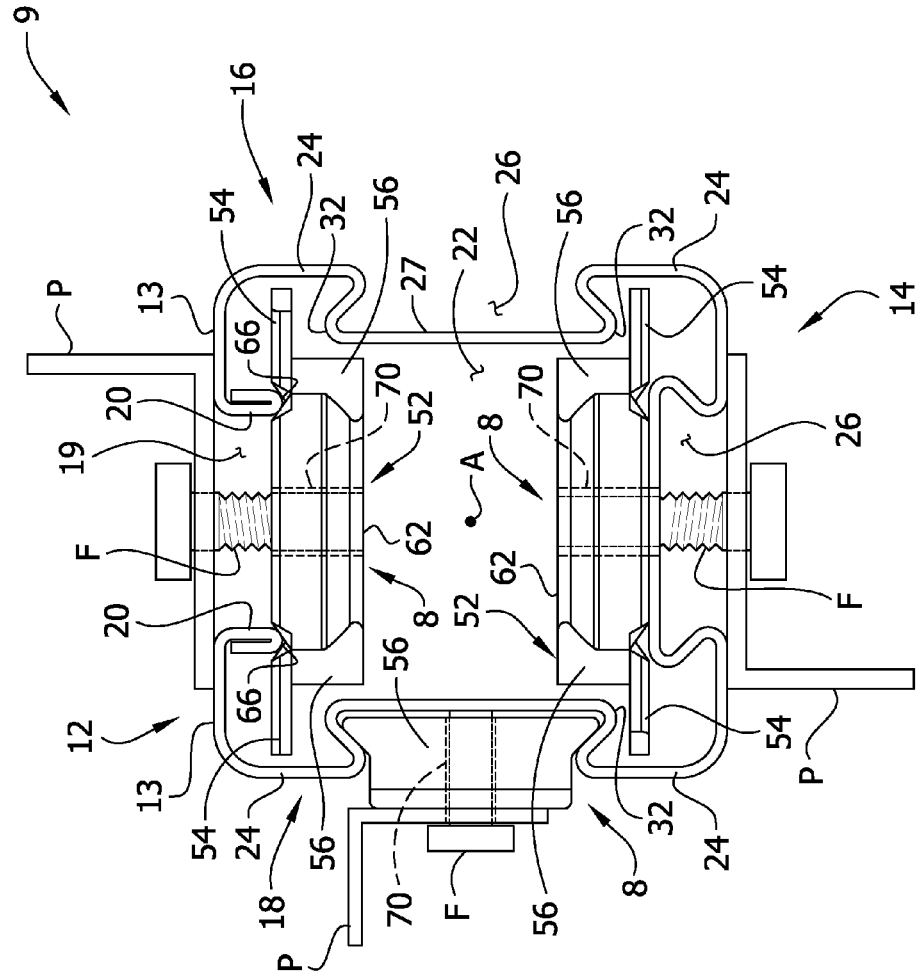
FIG. 11 is a front elevation of the channel framing assembly in FIG. 10.

As seen in FIGS. 10 and 11 described above, the fastener nut 8 can be inserted into the external fitting grooves 26 on the left, right, and lower sides 18, 16, 14, respectively, of the channel framing 10, and used to secure or fasten a part P (e.g., bracket B) on the exterior of the channel framing. In one example, the fastener nut 8 is slidably received in one of the open longitudinal ends of the fitting groove 26, and slid along the length of the channel framing 10 to a desired longitudinal position. In one embodiment, a threaded fastener F (e.g., a threaded bolt or threaded stud associated with the part) may be threaded into the fastener opening 70 to secure the part P to the channel framing, as seen in FIGS. 11 and 13. For example, in this embodiment the threaded fastener F may function as a set screw, whereby the fastener is threaded into the opening 70 and through the top 60 of the nut body 52 so that the tip or terminal end of the threaded fastener engages the exterior surface of the inner wall 30 of the inward portion 23 of one of the sides 14, 16, 18. The engagement of the tip or terminal end of the threaded fastener F with the inner wall 30 of the corresponding inward portion 23 of the side 14, 16, 18 inhibits sliding movement of the fastener nut 8, and thus the part P, within the fitting groove 26, thereby fastening the fastener nut and the part to the channel framing. In one embodiment of a method of assembling a channel framing assembly 9, a part P can be secured to channel framing 10 using one or more of the fitting grooves 26, as set forth above, concurrently with additional parts P secured to the same channel framing using one or more of the T-shaped tracks 40, 42, 44, 46.

Figure 12:
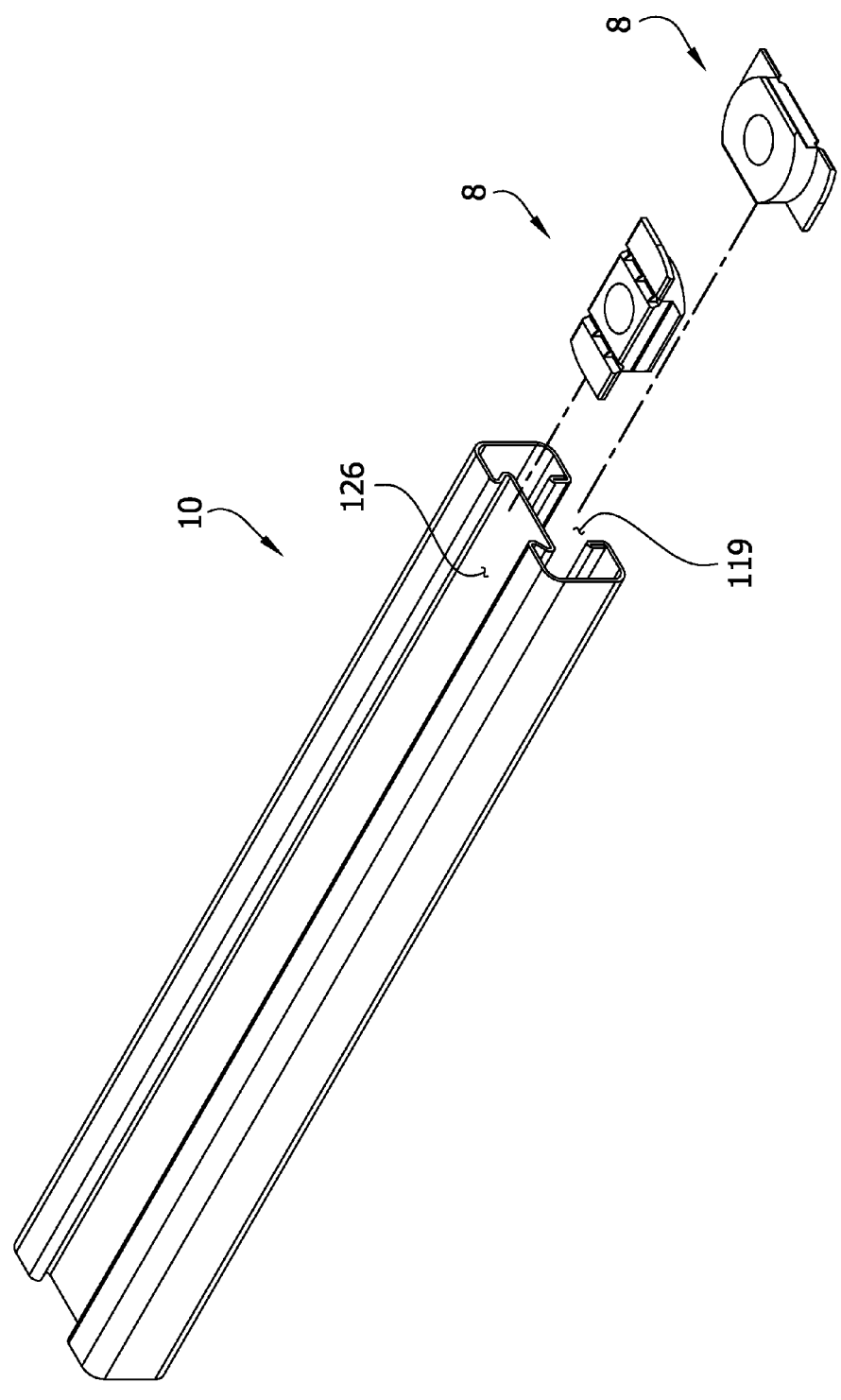
FIG. 12 is an exploded view of a second embodiment of a channel framing assembly including a plurality of the fastener nuts and the channel framing.

Referring to FIGS. 12 and 13, the channel nut 8 may also be used with a second embodiment of channel framing, generally indicated at 110. This channel framing 108 is similar to the first channel framing 10, with like components indicated by corresponding reference numerals, plus 100. The main difference between the second channel framing 110 and the first channel framing 10 is that the second channel framing has a height H extending between the upper and lower sides 112, 114 that is less than the corresponding height of the first channel framing 10. Like the first embodiment, the upper side 112 of the channel framing 110 defines the slot 119. However, unlike the first embodiment, the lower side 114 is the only side that includes the inner portion 123 that defines the external fitting groove 126 and the internal rail 127. The left and right sides 118, 116 are generally planar and do not include an inner portion.

Figure 14:
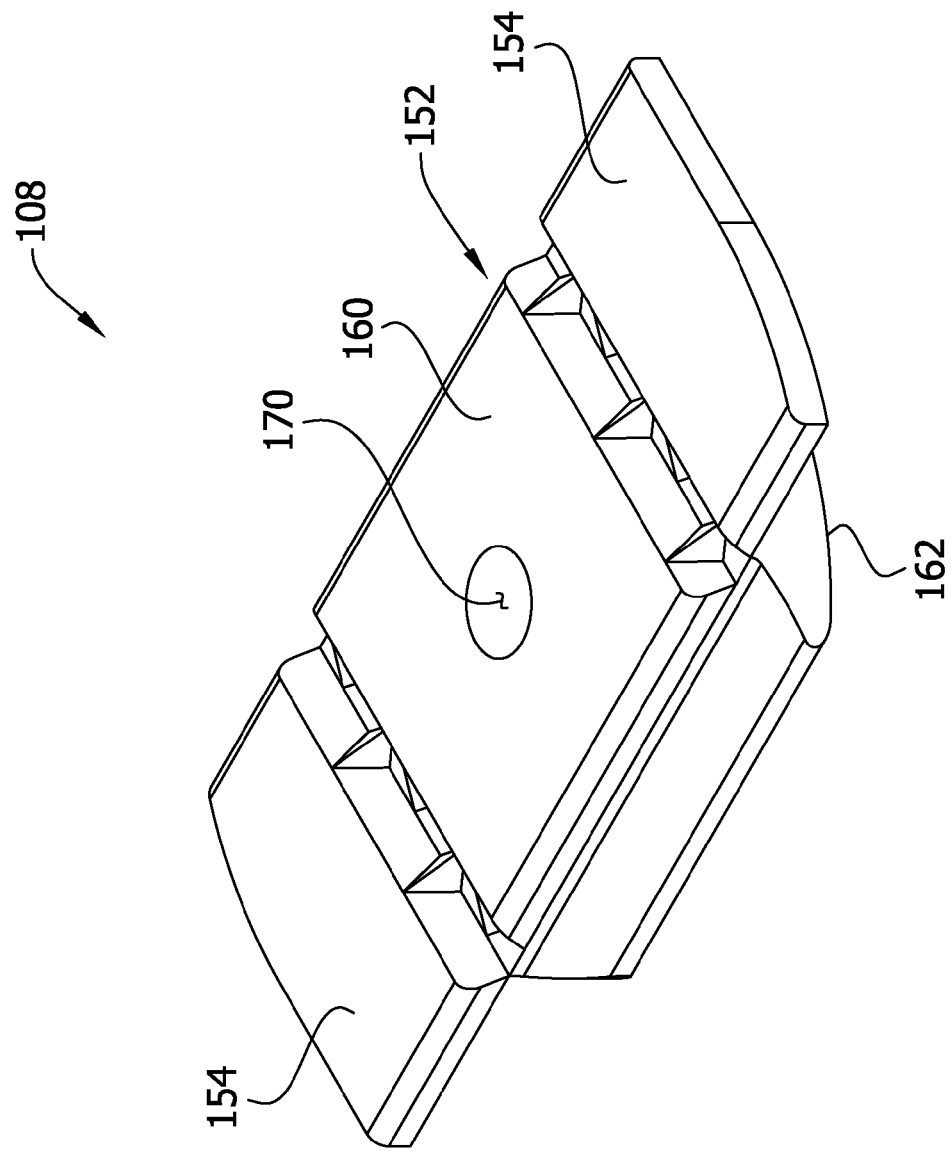
FIG. 14 is a perspective of a second embodiment of a fastener nut.
Figure 15:
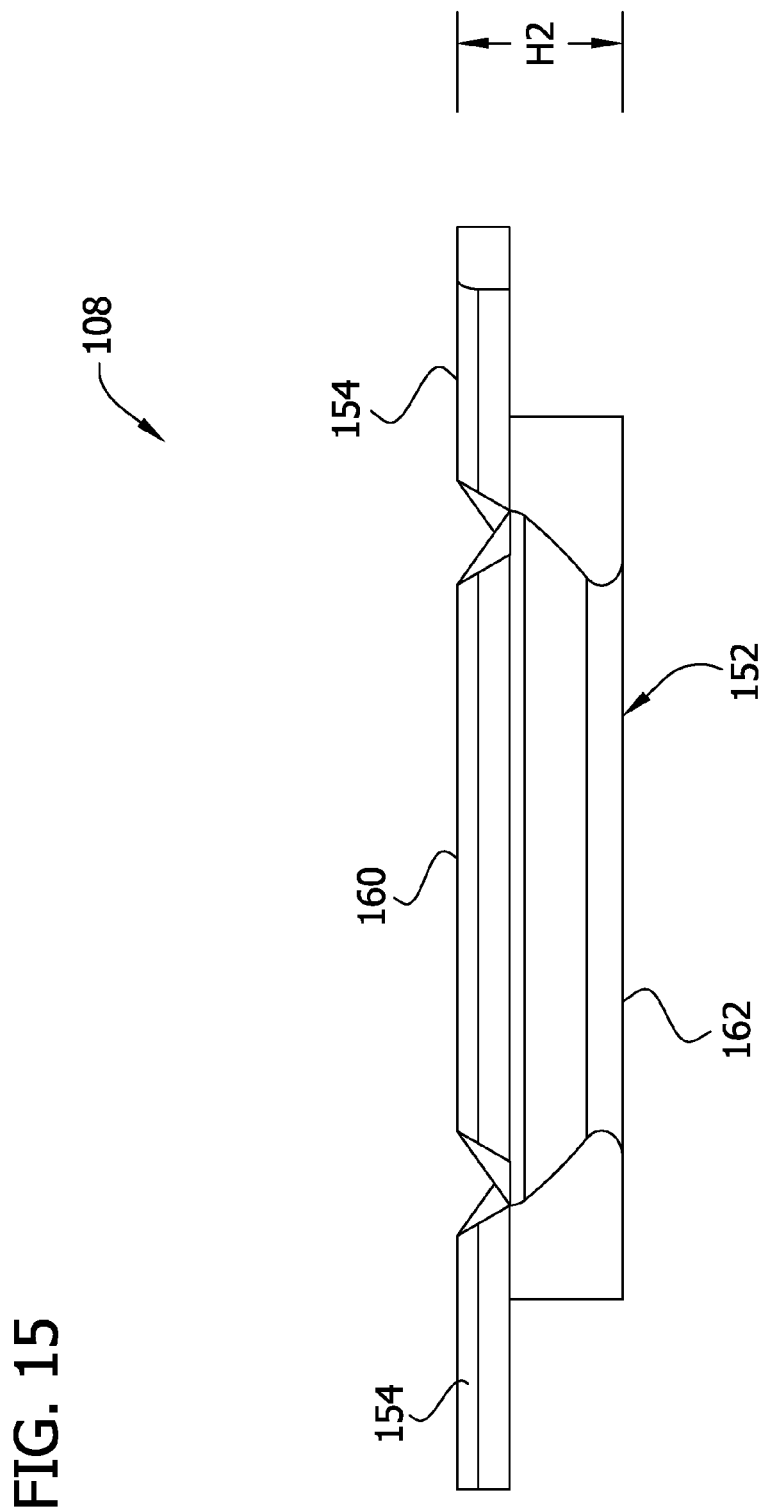
FIG. 15 is a left elevation of the second fastener nut.
Figure 16:
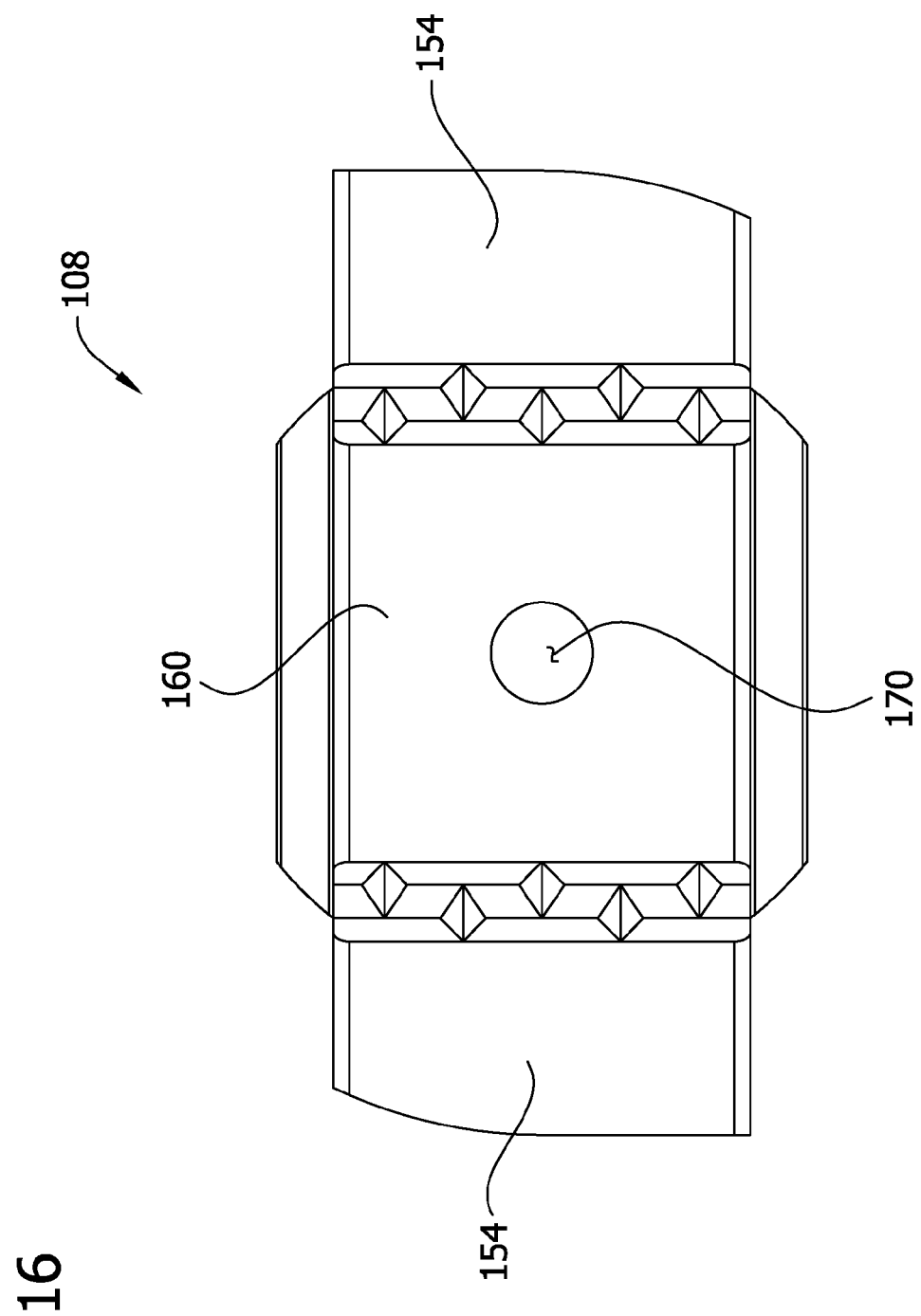
FIG. 16 is a top elevation of the second fastener nut.
Figure 17:
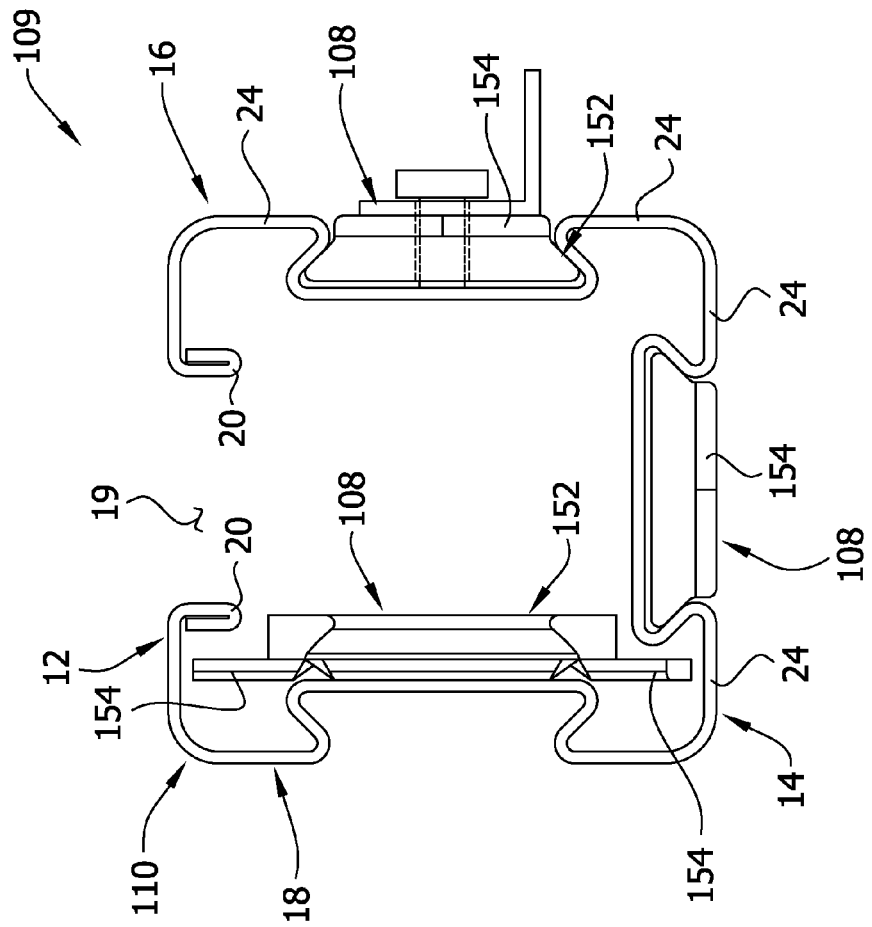
FIG. 17 is a front elevation of a third embodiment of a channel framing assembly including a plurality of the second fastener nuts and the channel framing.

Referring to FIGS. 14-16, another embodiment of a fastener nut is generally indicated at reference numeral 108. This fastener nut 108 is similar to the first fastener nut 8 described above, with differences being described hereinafter. Components and structures of the second fastener nut 108 that are similar or identical to the respective components and structures of the first fastener nut 8 are indicated by corresponding reference numerals, plus 100. The main difference between the second fastener nut 108 and the first fastener nut 8 is that the second fastener nut has a height H2 extending between the top 160 and the bottom 162 of the nut body 152 that is less than the height H1 of the first fastener nut 8. Another difference is that the threaded opening 170 (FIGS. 14 and 16) in the second fastener nut 108, for threadably receiving a threaded fastener F2 (FIG. 17) has a smaller diameter than the diameter of the threaded opening 70 of the first fastener nut 8. The other components and structures of the present fastener nut 108, including but not limited to the general dovetail shape of the nut body 152 and the wings 154, are similar or substantially identical to the first fastener nut 8. It is envisioned that the second fastener nut 108 may be used for light duty applications, as compared to the first fastener nut 8, because the second fastener F2 will have at least a threaded diameter less than that of the first fastener F. The fastener nut 108 may be secured to the channel framing 10, 110 in the same manner as set forth above with respect to the first fastener nut 8. In the illustrated embodiment and as shown in FIG. 17, the height H2 of the second fastener nut 108 is such when the channel nut is inserted in one or more of the fitting groove 26 and secured to the channel framing 10, such as by a fastener F2, the top 160 of the channel nut 108 is generally flush with (e.g., coplanar) with the outer portions 24 of the side 14, 16, 18 of the channel framing 10 associated with the selected fitting groove.

Figure 18:
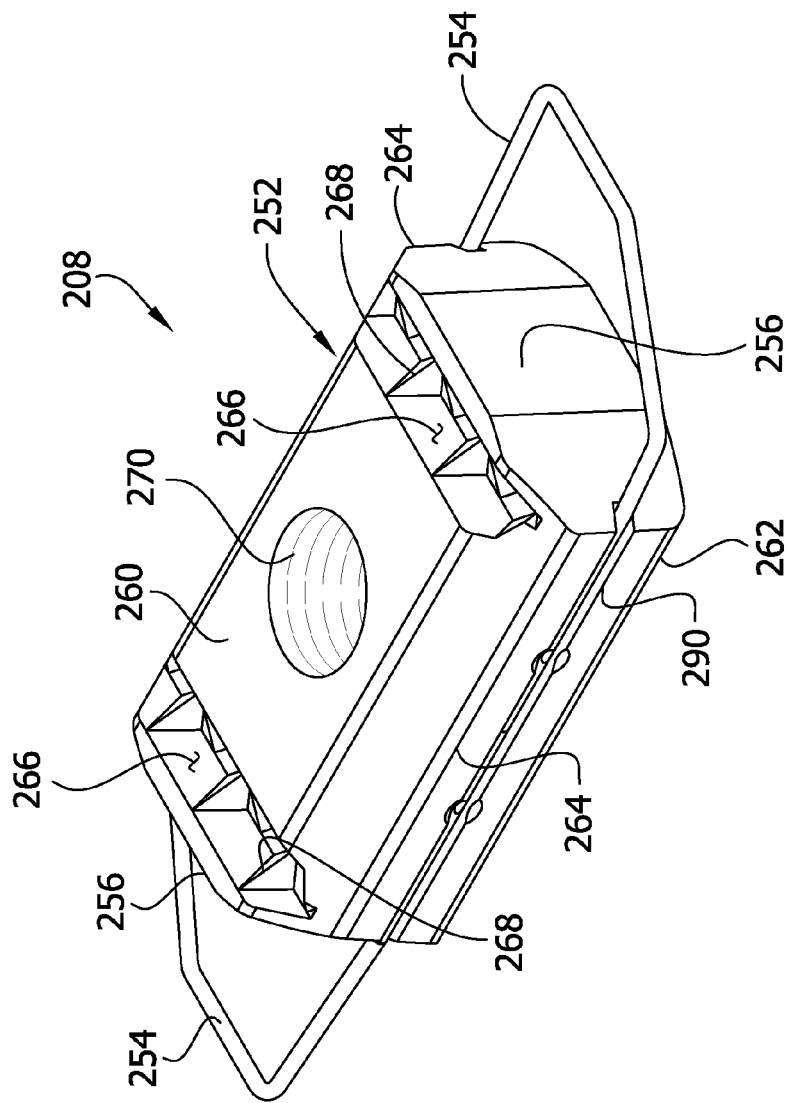
FIG. 18 is a perspective of a third embodiment of a fastener nut.
Figure 19B:
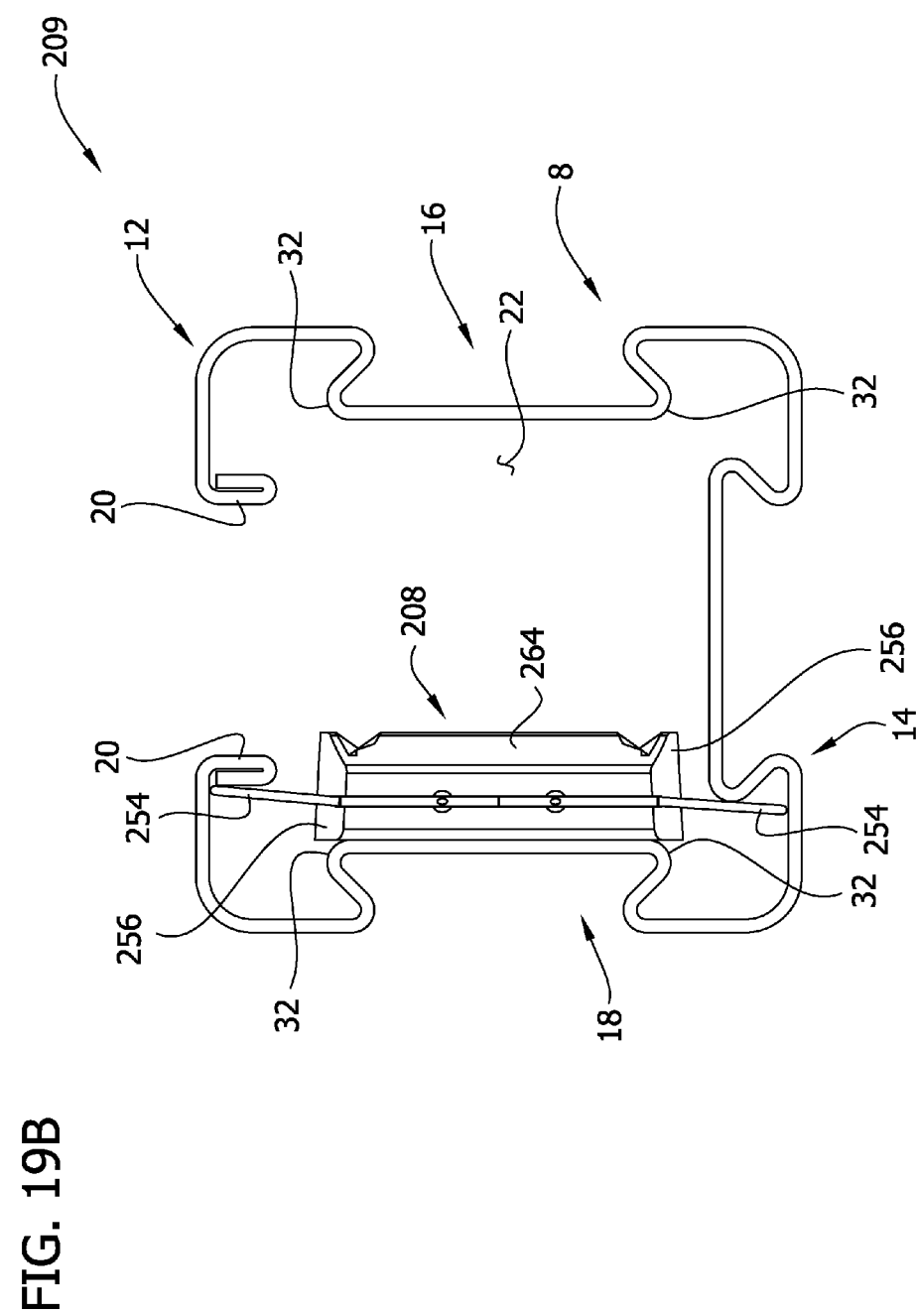
FIG. 19B is similar to FIG. 19B, but showing the third nuts in left and right tracks of the channel framing.

Referring to FIGS. 18, 19A and 19B, a third embodiment of a fastener nut is generally indicated at reference numeral 208, and a third embodiment of a channel framing assembly is generally indicated at reference numeral 209. The fastener nut 208 includes a nut body, generally indicated at 252, and opposite end extensions or wings, generally indicated at 254, extending outward from respective opposite longitudinal ends 256 (e.g., left and right ends) of the body. As used throughout the present disclosure with respect to the fastener nut 208, the terms denoting relative locations and positions of structures and components of the fastener nut, including but not limited to the terms "upper," "lower," "right," "left," "top," and "bottom," are meant to provide a point of reference for such components and structures of the fastener nut as shown in FIG. 18, with the understanding that the respective relative locations of the components and structures will depend on the orientation of the fastener nut in use.

In addition to the longitudinal ends 256, the nut body 252 has a top 260, a bottom 262, and opposite sides 264 extending longitudinally between the opposite longitudinal ends 256. The longitudinal ends 256 are rounded (e.g., radiused) between the opposite sides 264 to facilitate insertion and positioning of the fastener nut 208 in a selected one of the T-shaped tracks 42, 44, 46, 48 in a crosswise or transverse orientation relative to the longitudinal axis A of the channel framing 10 (or channel framing 110), as explained above with respect to the first embodiment. The top 260 of the body portion 252 defines lip-receiving grooves 266 adjacent the opposite longitudinal ends 256 of the body portion and the wings 254. The lip-receiving grooves 266 extend generally transverse to the length of the fastener nut 208, and are configured for receiving the inturned lips 20 when the fastener nut is fastened within the upper T-shaped track 40 (FIG. 19A). A plurality of teeth 268 are disposed in the lip-receiving grooves 266 to facilitate frictional engagement with the inturned lips 20. The bottom 262 of the nut body 252 is generally planar (e.g., flat) although it may have other contours. A threaded fastener opening 270 (e.g., a through opening) extends from the top 260 toward, and in the illustrated embodiment, through the bottom 262 of the nut body 252, in a direction generally transverse (e.g., orthogonal) to the length of the fastener nut 208. The fastener opening 270 receives a fastener F (e.g., a threaded bolt or threaded stud; e.g., FIG. 19A) associated with the part P (e.g., the bracket) for securing the part to the channel framing 208, as explained in detail above with respect to the first embodiment. In another embodiment, the fastener opening 270 may be non-threaded and/or may be a blind opening, as opposed to the illustrated through opening. For example, a threaded fastener opening may extend from the top 260 toward the bottom 262, but not through the bottom.

Unlike the first embodiment, the present fastener nut 208 is not configured for reception in the dovetail shaped grooves 26, 126 of the channel framing 10, 110. Moreover, another difference between the present fastener nut 208 and the first embodiment is that the wings 254 of the present fastener nut comprise at least one wire extending longitudinally outward from respective longitudinal ends 256 of the nut body 252 adjacent the top 260 of the nut body. The wings 254 have respective terminal ends and together the wings define an effective wing span extending between the terminal ends of the wings, which in the illustrated embodiment is the same as the length of the fastener nut 208.

In the illustrated embodiment, a single wire forms the pair of wings 254, although in other embodiments two or more wires may form the wings. In one example, the wire 254 is formed from stainless steel or other material. The wire 254 extends at least partially around the fastener nut body 252. Portions of the wire 254 are press fit in grooves 290 (FIG. 18) defined by the sides 264 of the nut body 252. The wire 254 may be secured to the body 252 in other ways. As shown in FIG. 19, the wings 254 are resiliently flexible out of plane. That is, the wings 254 are resiliently bendable in a direction generally transverse to the length of the nut body 252 and the wing span. In this way, when the fastener nut 208 is received in one of the T-shaped tracks 40, 42, 44, 46 such as in a manner disclosed above with respect to the first embodiment, the wings 254 engage the shoulders 32 and urge the nut body 252 toward a respective side 12, 14, 16, 18 of the channel framing 8. In this way, the nut body 252 frictionally engages the respective inner portion 23 or the lips 20 to inhibit movement of the fastener nut 208 lengthwise of the channel framing 8. Thus, the fastener nut 208 is inhibited from both transverse movement and longitudinal movement relative to the channel framing 8 when the fastener nut is received in one of the T-shape slots 40, 42, 44, 46.

Figure 20:
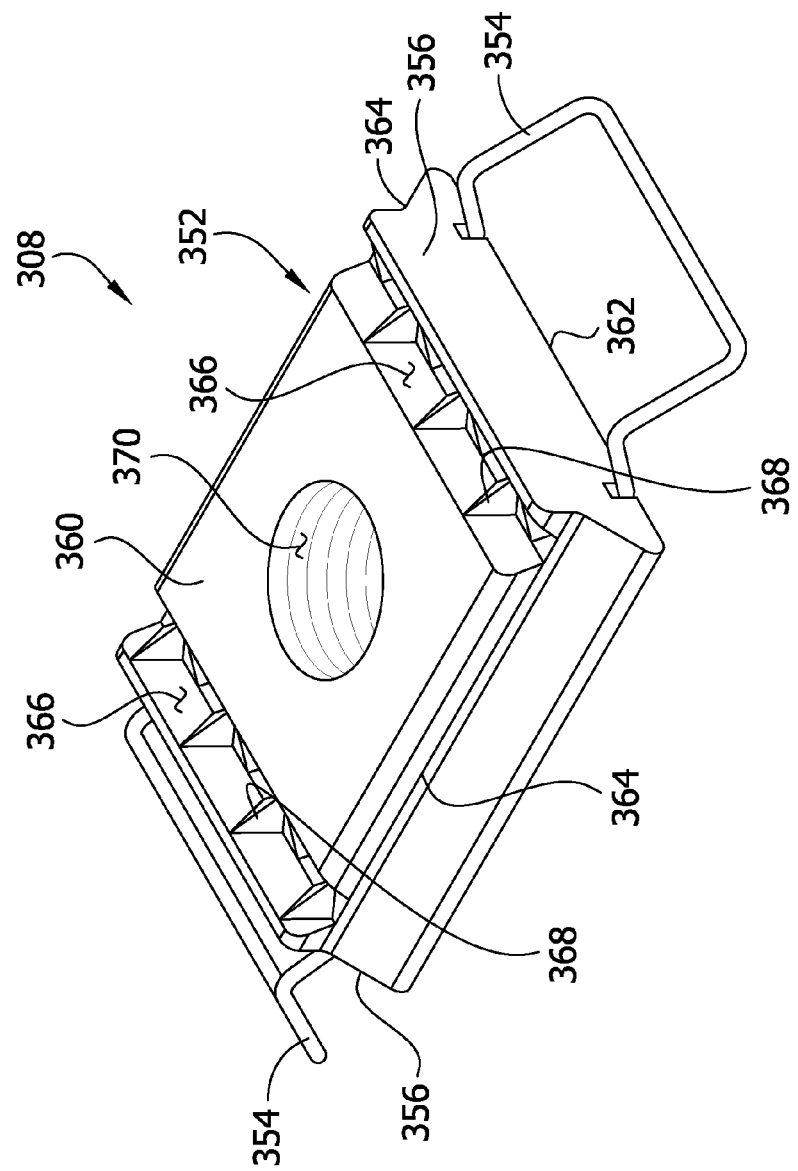
FIG. 20 is a perspective of a fourth embodiment of a fastener nut.
Figure 21:
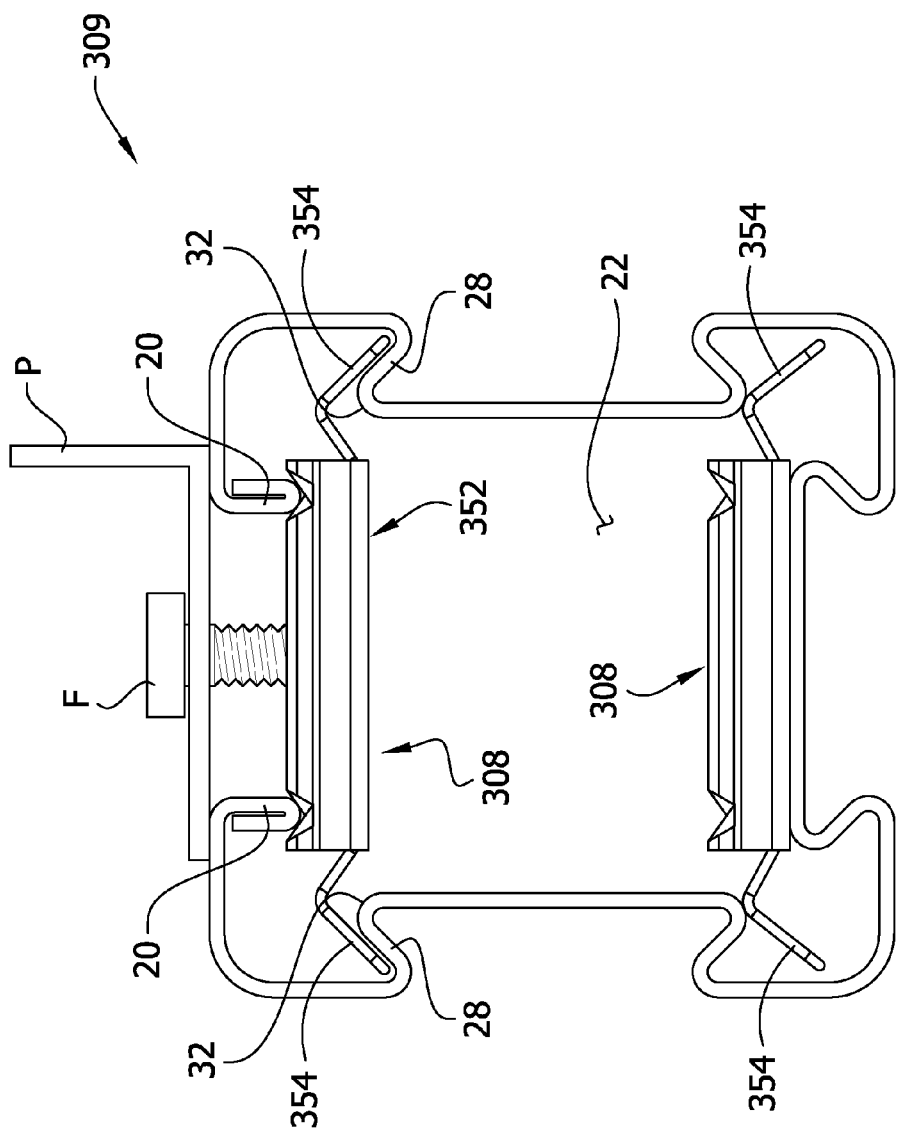
FIG. 21 is a front elevation of a fourth embodiment of a channel framing assembly including the fourth embodiment of the fastener nut.
Figure 22:
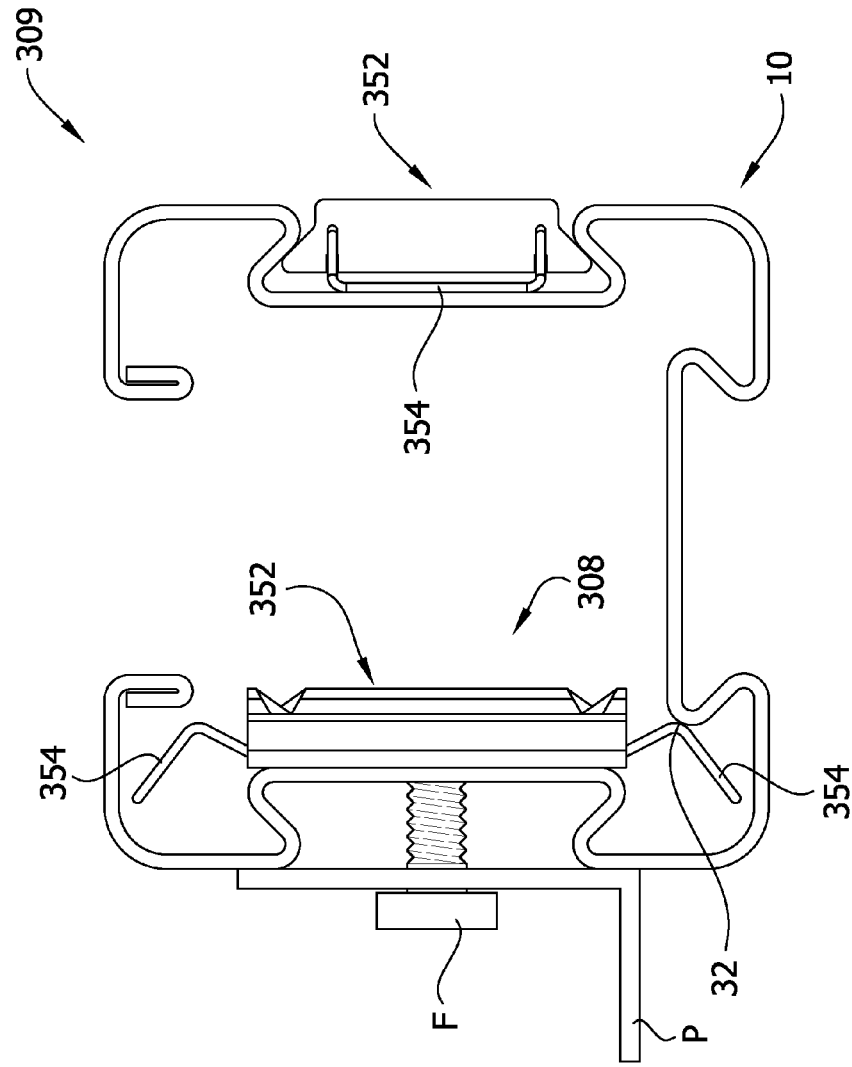
FIG. 22 is another example of the fourth embodiment of the channel framing assembly.

Referring to FIG. 20-22, a fourth embodiment of the fastener nut is generally indicated at reference numeral 308, and a fourth embodiment of a channel framing assembly is generally indicated at reference numeral 309. The fastener nut 308 includes a nut body, generally indicated at 352, and opposite end extensions or wings 354 extending outward from respective opposite longitudinal ends 356 (e.g., left and right ends) of the body. As used throughout the present disclosure with respect to the fastener nut 308, the terms denoting relative locations and positions of structures and components of the fastener nut, including but not limited to the terms "upper," "lower," "right," "left," "top," and "bottom," are meant to provide a point of reference for such components and structures of the fastener nut 308 as shown in FIG. 20, with the understanding that the respective relative locations of the components and structures will depend on the orientation of the fastener nut in use.

In addition to the longitudinal ends 356, the nut body 352 has a top 360, a bottom 362, and opposite sides 364 extending longitudinally between the opposite longitudinal ends. The top 360 of the body portion 352 defines lip-receiving grooves 366 adjacent the opposite longitudinal ends 356 of the body portion and the wings 354. The lip-receiving grooves 366 extend generally transverse to the length of the fastener nut 308, and are configured for receiving the inturned lips 20 when the fastener nut is fastened within the upper T-shaped track 40 (FIG. 21). A plurality of teeth 368 are disposed in the lip-receiving grooves 366 to facilitate frictional engagement with the inturned lips 20. The bottom 362 of the nut body 352 is generally planar (e.g., flat) although it may have other contours. A threaded fastener opening 370 (e.g., a through opening) extends from the top 360 through the bottom 362 of the nut body 352, in a direction generally transverse (e.g., orthogonal) to the length of the fastener nut 308. The fastener opening 370 receives a fastener F associated with the part P (e.g., the bracket) for securing the part to the channel framing 8, in a manner similar to that described above with respect to the first embodiment. In another embodiment, the fastener opening 370 may be non-threaded and/or may be a blind opening, as opposed to the illustrated through opening. For example, a threaded fastener opening may extend from the top 360 toward the bottom 362 but does not extend through the bottom.

Each of the sides 364 of the nut body 352 has a lower, flared portion 372 that flares outward toward the bottom 362 of the body 352 such that the sides 364 and the bottom together define a generally dovetail shape. In particular, an end profile of the body 352 (particularly, the end profile defined by the sides 364 and the bottom 362) generally corresponds to the end profiles (or cross-sectional shapes) of the fitting grooves 26, 126 defined by the channel framing 10, 110. The body 352, in particular the flared portion 372, is sized so that it is capable of being slidingly received and captured in the grooves 26, 126 through the open longitudinal ends of the grooves. Once the body portion 352 is received in the groove 26, 126, the fastener nut 308 can slide longitudinally within the groove, but the fastener nut is inhibited from being withdrawn from the groove in a direction transverse from the longitudinal axis A of the channel framing. Thus, the fastener nut 308 can be positioned at a desired longitudinal location on the exterior of the channel framing 10 by sliding the fastener nut lengthwise of the channel framing within the groove 26. In the illustrated embodiment, the fastener nut 308 has a maximum width at the dovetail portion of the nut body 352 that is less than the width of the slot 19 in the upper side 12 of the channel framing 10 so that the fastener nut can be inserted through the slot and into the interior 22 of the channel framing, as explained above with respect to the first embodiment.

A difference between the present fastener nut 308 and the first fastener nut 8 is that the wings 354 of the present fastener nut comprises at least one wire extending longitudinally outward from respective longitudinal ends 356 of the nut body 352. In the illustrated embodiment, the wings 354 are bent out of plane and have generally inverted V-shapes. The wings 354 have respective terminal ends and together the wings define an effective wing span extending between the terminal ends of the wings, which in the illustrated embodiment is the same as the length of the fastener nut 308. The effective wing span is greater than a length of the nut body 352 such that at least a portion of the fastener nut 308 has a generally T-shaped side profile. In the illustrated embodiment the entirety of the fastener nut 308 has a generally T-shaped profile.

In the illustrated embodiment, a single wire forms the pair of wings 354, although in other embodiments two or more wires may form the wings. In one example, the wire is formed from stainless steel or other material. Portions of the wire 354 are press fit in grooves 390 defined by the bottom 362 of the nut body 352. The wire 354 may be secured to the body 352 in other ways. As shown in FIG. 21, the wings 354 are resiliently flexible out of plane. That is, the wings 354 are resiliently bendable in a direction generally transverse to the length of the nut body 352 and the wing span. In this way, when the fastener nut 308 is received in the upper or lower T-shaped slots 40, 42 of the channel framing 10, 110, such as in a manner disclosed above with respect to the first embodiment, the wings 354 engage the sidewalls 28 and urge the nut body 352 toward a respective one of the upper and lower sides 12, 14 of the channel framing 10, 110. Moreover, as shown in FIG. 22, when the fastener nut 352 is received in the left or right T-shaped slot 44, 46, the peak of the respective V-shaped wing engages the shoulder 32 of the inner portion 23 of the lower side 14 to urge the nut body 352 toward a respective one of the left and right sides 16, 18 of the channel framing 10, 110. In this way, the nut body 352 frictionally engages the channel framing 10 to inhibit movement of the fastener nut 308 lengthwise of the channel framing, although the fastener nut can still be slid by hand within the respective T-shaped slot by applying a force that overcomes the frictional force. Thus, the fastener nut is inhibited from both transverse movement and longitudinal movement relative to the channel framing when the fastener nut is received in the T-shape slot to facilitate positioning of the fastener nut in the channel framing before securing the fastener nut using the fastener.

As set forth above, the fastener nut 308 is also receivable in the grooves defined by the channel framing 10, 110. When the fastener nut is received in one of the grooves, the bent wings engage the floor of the grooves and deflect out of plane to urge the fastener nut outward from the channel framing. In this way, the dovetail portion of the fastener nut body frictionally engages the opposite walls of the grooves. Thus, the fastener nut is inhibited from both transverse movement and longitudinal movement relative to the groove of the channel framing when the fastener nut is received in the groove to facilitate positioning of the fastener nut in the channel framing before securing the fastener nut using the fastener.

Figure 23:
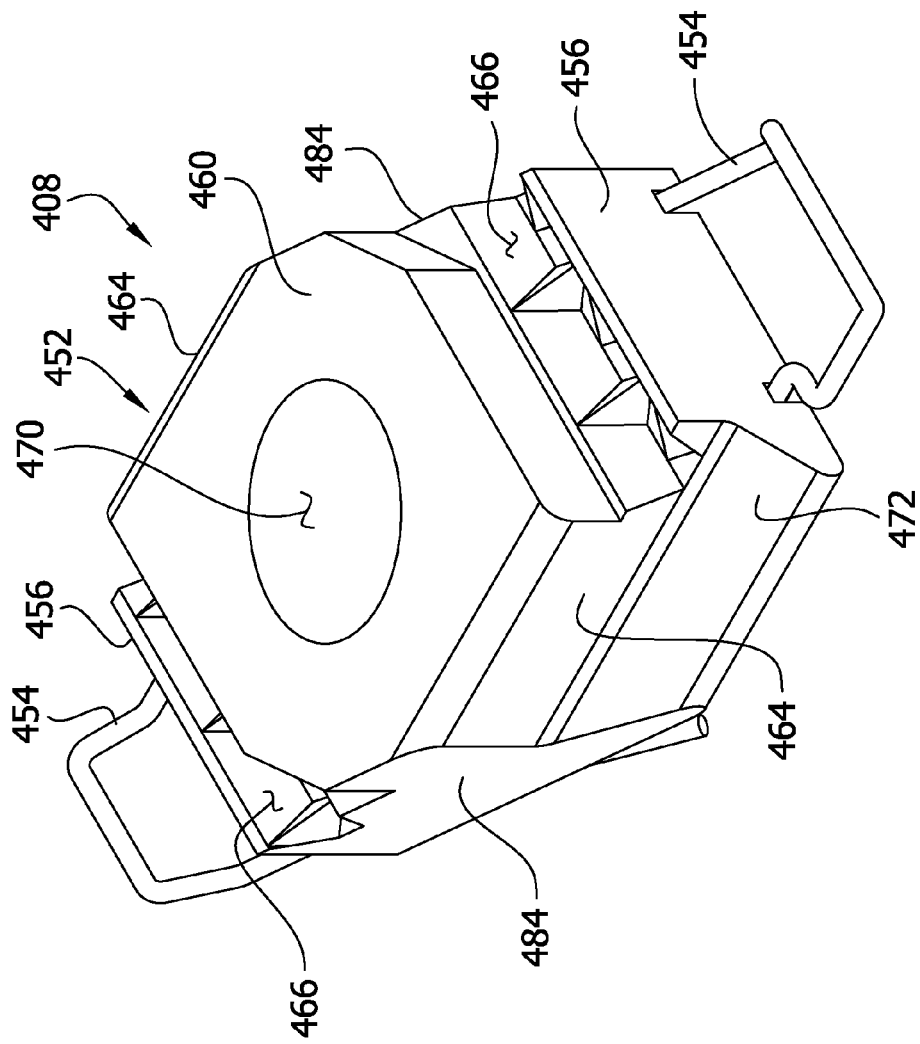
FIG. 23 is a perspective of a fifth embodiment of a fastener nut.

Referring to FIGS. 23-26, a fifth embodiment of the fastener nut is generally indicated at reference numeral 408, and a fifth embodiment of a channel framing assembly is generally indicated at reference numeral 409. The fifth embodiment of the fastener nut 408 is similar to the fourth embodiment 308, with differences between the two being described below. The fastener nut 408 includes a nut body, generally indicated at 452, and opposite end extensions or wings 454 extending outward from respective opposite longitudinal ends 456 (e.g., left and right ends) of the body. As used throughout the present disclosure with respect to the fastener nut 408, the terms denoting relative locations and positions of structures and components of the fastener nut, including but not limited to the terms "upper," "lower," "right," "left," "top," and "bottom," are meant to provide a point of reference for such components and structures of the fastener nut 408 as shown in FIG. 23, with the understanding that the respective relative locations of the components and structures will depend on the orientation of the fastener nut in use.

Figure 24:
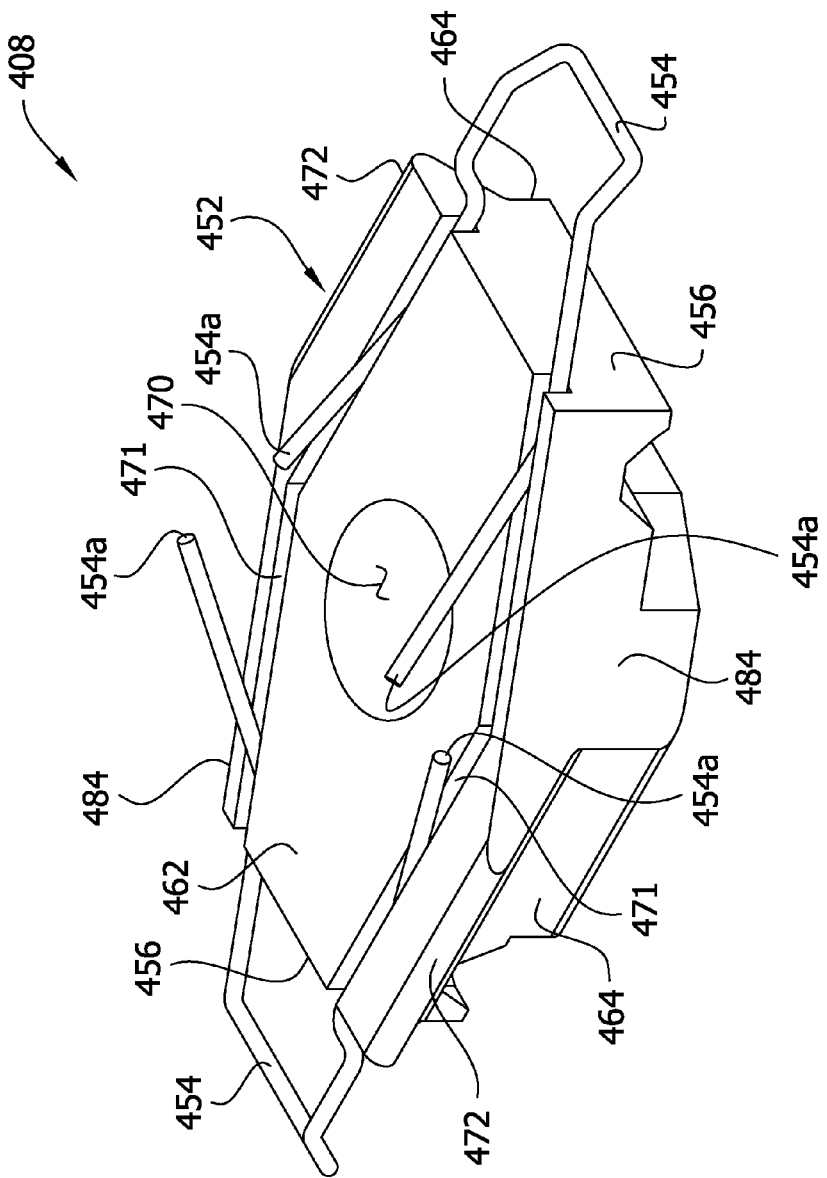
FIG. 24 is a bottom perspective of the fifth embodiment of the fastener nut.
Figure 25:
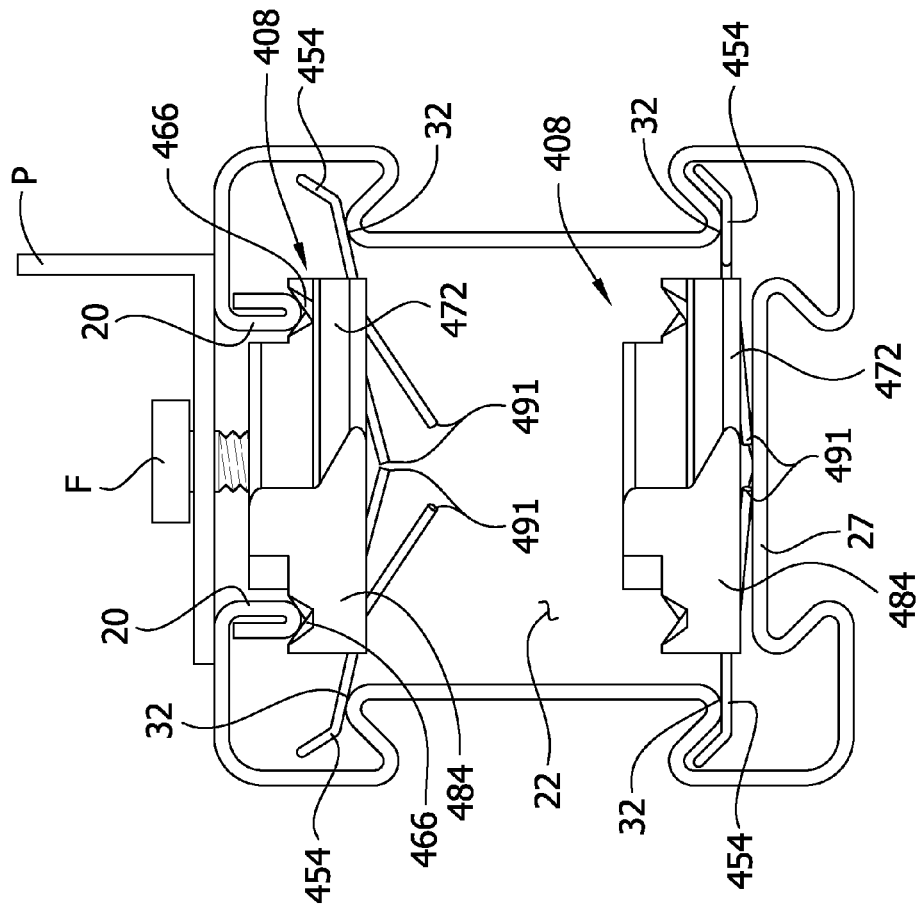
FIG. 25 is a front elevation of a fifth embodiment of a channel framing including the fifth embodiment of the fastener nut.

In addition to the longitudinal ends 456, the nut body 452 has a top 460 (FIG. 23), a bottom 462 (FIG. 24), and opposite sides 464 extending longitudinally between the opposite longitudinal ends. The top 460 of the body portion 452 defines lip-receiving grooves 466 adjacent the opposite longitudinal ends 456 of the body portion and the wings 454. The lip-receiving grooves 466 extend generally transverse to the length of the fastener nut 408, and are configured for receiving the inturned lips 20 when the fastener nut is fastened within the upper T-shaped track 40 (FIG. 25). A plurality of teeth 468 are disposed in the lip-receiving grooves 466 to facilitate frictional engagement with the inturned lips 20. The bottom 462 of the nut body 452 is generally planar (e.g., flat) although it may have other contours. A threaded fastener opening 470 (e.g., a through opening) extends from the top 460 through the bottom 462 of the nut body 452, in a direction generally transverse (e.g., orthogonal) to the length of the fastener nut 308. The fastener opening 470 receives a fastener F associated with the part P (e.g., the bracket) for securing the part to the channel framing 8, in a manner similar to that described above with respect to the first embodiment. In another embodiment, the fastener opening 470 may be non-threaded and/or may be a blind opening, as opposed to the illustrated through opening. For example, a threaded fastener opening may extend from the top 460 toward the bottom 462 but does not extend through the bottom.

The wings 454 comprise at least one wire extending longitudinally outward from respective longitudinal ends 456 of the nut body 452. In the illustrated embodiment, the wings 454 are bent out of plane. The wings 454 have respective terminal ends, and together the wings define an effective wing span extending between the terminal ends of the wings, which in the illustrated embodiment is the same as the length of the fastener nut 408. The effective wing span is greater than a length of the nut body 452 such that at least a portion of the fastener nut 408 has a generally T-shaped side profile. In the illustrated embodiment the entirety of the fastener nut 408 has a generally T-shaped profile. In the illustrated embodiment, each wing 454 is formed from a separate wire, although in other embodiments two or more wires may form each wing, or the wings may be formed from a single wire. In one example, the wire is formed from stainless steel or other material. As shown in FIG. 24, portions of the wires 454 are press fit in grooves 471 defined by the bottom 462 of the nut body 452 and free ends 454a of each wire extends outward from the respective grooves and downward (i.e., outward) below the bottom of the nut body. The wire may be secured to the body 452 in other ways. The wings 454 and the free ends 454a of the wires are resiliently flexible out of plane. That is, the wings 454 and the free ends 454a are resiliently bendable or movable in a direction generally transverse to the length of the nut body 452 and the wing span (e.g., upward and downward directions).

Figure 24A:
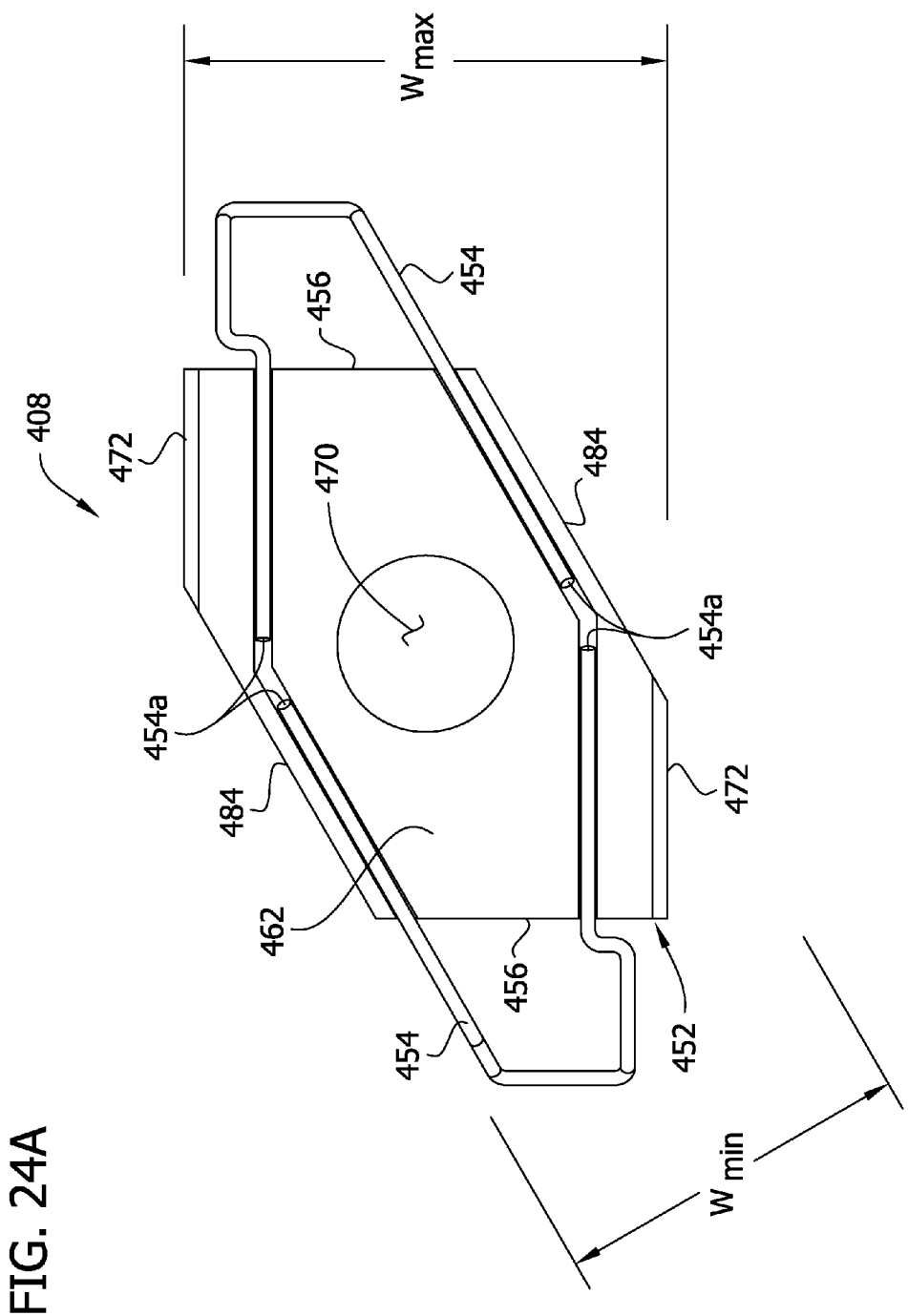
FIG. 24A is a bottom plan view of the fifth embodiment of the fastener nut.

Each of the sides 464 of the nut body 452 has a lower, flared portion 472 that flares outward toward the bottom 462 of the body 452 such that the sides 464 and the bottom together define a generally dovetail shape. In particular, an end profile of the body 452 (particularly, the end profile defined by the sides 464 and the bottom 462) generally corresponds to the end profiles (or cross-sectional shapes) of the fitting grooves 26, 126 defined by the channel framing 10, 110. Moreover, unlike the fourth embodiment, the nut body 452 has diagonally opposite corners that are truncated to form truncated corner portions 484 between the ends 456 and the sides 464 of the body. As shown in FIG. 24A, the truncated corner portions 484 extend generally parallel to one another, at an angle offset from a longitudinal axis of the body 452, to define a minimum width $W_{min}$ of the nut body and the nut 408. The minimum width $W_{min}$ extending between the truncated corner portions 484 is less than a maximum width $W_{max}$ extending between the sides 464 (more specifically the flared portions 472) of the nut body 452.

Figure 26:
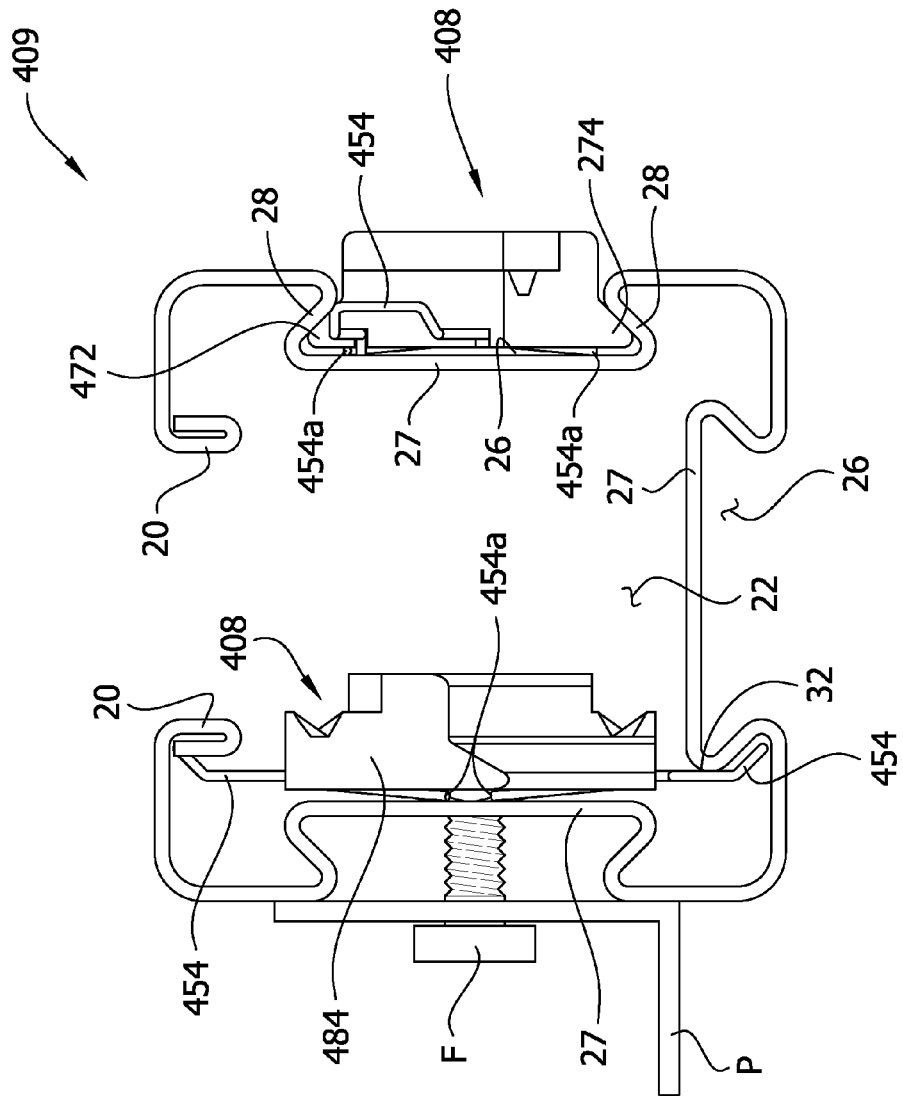
FIG. 26 is another example of the fifth embodiment of the channel framing assembly.

The minimum width $W_{min}$ of the nut 408 is also less than (e.g., slightly less than) the width W1 of the upper slot 19 such that the nut can be inserted through the upper slot and into the interior space 22 by orientating the nut relative to the slot so that the truncated corner portions 484 are generally aligned with (e.g., coplanar with) the lips 20 defining the slot. Once received in the interior space 22, the nut 408 is positioned adjacent one of the T-shaped slots and then rotated (e.g., rotated 90 degrees) so that the wings 454 enter the corresponding T-shaped slot 40, 42, 44, 46. When the fastener nut 408 is received in the upper or lower T-shaped slots 40, 42 of the channel framing 10 (FIG. 25), 110, such as in a manner disclosed above, the free ends 454a of the wires engage the internal rail 27 to urge the body 452 away from the internal rail such that the wings 454 engage the shoulder 32 and/or the sidewalls 28. Moreover, as shown in FIG. 26, when the fastener nut 452 is received in the left or right T-shaped slot 44, 46, the free ends 454a of the wires engage the internal rail 27 to urge the body 452 away from the internal rail such that the respective wings 454 engage the shoulder 32 of the inner portion 23 of the lower side 14 and one of the lips 20. In this way, the fastener nut 408 (more specifically the wings 454 and the free ends 491 of the wires) frictionally engages the channel framing 10 to inhibit movement of the fastener nut 408 lengthwise of the channel framing, although the fastener nut can still be slid by hand within the respective T-shaped slot by applying a force that overcomes the frictional force. Thus, the fastener nut 408 is inhibited from both transverse movement and longitudinal movement relative to the channel framing when the fastener nut is received in the T-shape slot to facilitate positioning of the fastener nut in the channel framing before securing the fastener nut using the fastener.

The minimum width $W_{min}$ of the nut 408 is also less than (e.g., slightly less than) the minimum width W2 of each of the grooves 26 so that the nut can be inserted through the open top of the groove by orientating the nut relative to the groove so that the truncated corner portions 484 are generally aligned with (e.g., coplanar with) the sides defining the groove. Once received in the groove 26, the nut 408 is rotated (e.g., rotated less than 45 degrees) so that the flared portions 472 of the nut body 252 engage the sidewalls 28. In this position in the groove 26, the nut 408 is inhibited from withdrawing through the top of the groove 26 without first counter-rotating the nut. Referring to FIG. 26, when the fastener nut 408 is received in the groove 26 defined by the channel framing 10, 110, such as described above, the free ends 454a of the wires engage the inner wall 30 defining the groove 26 and deflect out of plane toward the bottom 462 of the body 452 to urge the fastener nut outward from the channel framing. In this way, the dovetail portions 472 of the fastener nut body 452 frictionally engages the opposite walls 28 of the groove 26 and the free ends 454a frictionally engage the inner wall 30. Thus, the fastener nut 408 is inhibited from both transverse movement and longitudinal movement relative to the groove 26 of the channel framing 10, 110 when the fastener nut is received in the groove to facilitate positioning of the fastener nut in the channel framing before securing the fastener nut using the fastener.

Having described embodiments of the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fastener nut for securing a part to a channel framing having a length and an open interior defining at least one internal, generally T-shaped track extending lengthwise of the channel framing, the fastener nut comprising:
   a nut body having a top, a bottom, opposite first and second longitudinal ends, opposite sides extending between the opposite longitudinal ends, a fastener opening extending from the top toward the bottom for receiving a fastener for securing the part to the channel framing, a length extending between the opposite first and second longitudinal ends, and a maximum width extending between the opposite sides, wherein the length is greater than the maximum width; and
   first and second wings extending longitudinally outward from the respective first and second longitudinal ends of the body, the first and second wings having respective terminal ends defining an effective wing span therebetween that is greater than the length of the body such that the fastener nut has a generally T-shaped side profile,
   wherein the fastener nut is insertable in the generally T-shaped track of the channel framing to allow the fastener nut to slide along the length of the channel framing and to restrict transverse movement of the fastener nut in the interior, relative to length of the framing, for use in positioning the fastener nut along the channel framing,
   wherein the sides of the nut body have lower portions that flare away from one another toward the bottom of the nut body such that a lower portion of the nut body has longitudinal end profiles that are generally dovetail-shaped.

2. The fastener nut set forth in claim 1, wherein each of the longitudinal ends of the nut body is rounded from adjacent one of the sides toward the other side.

3. The fastener nut set forth in claim 1, wherein the wings extend longitudinally outward from adjacent the top of the nut body.

4. The fastener nut set forth in claim 3, wherein the wings are integral extensions of the nut body.

5. The fastener nut set forth in claim 4, wherein the wings comprise flanges having upper surfaces generally coplanar with the top of the nut body.

6. The fastener nut set forth in claim 1, wherein the wings are resiliently flexible.

7. The fastener nut set forth in claim 6, wherein the wings comprise at least one wire.

8. The fastener nut set forth in claim 1, wherein the maximum width of the nut body is less than the effective wing span of the first and second wings.

9. A channel framing assembly comprising:
   a channel framing having a length and an open interior defining at least one internal, generally T-shaped track extending lengthwise of the channel framing; and
   a fastener nut for securing a part to the channel framing, the fastener nut including
      a nut body having a top, a bottom, opposite first and second longitudinal ends, opposite sides extending between the opposite longitudinal ends, a fastener opening extending from the top toward the bottom for receiving a fastener for securing the part to the channel framing, a length extending between the opposite first and second longitudinal ends, and a maximum width extending between the opposite sides, wherein the length is greater than the maximum width, and
      first and second wings extending longitudinally outward from the respective first and second longitudinal ends of the body, the first and second wings having respective terminal ends defining an effective wing span therebetween that is greater than the length of the body such that the fastener nut has a generally T-shaped side profile,
   wherein the fastener nut is insertable in the generally T-shaped track of the channel framing to allow the fastener nut to slide along the length of the channel framing and to restrict transverse movement of the fastener nut in the interior, relative to length of the framing, for use in positioning the fastener nut along the channel framing,
   wherein the channel framing includes a side defining an external dovetail-shaped groove extending lengthwise of the channel framing, wherein the sides of the nut body have lower portions that flare away from one another toward the bottom of the nut body such that a lower portion of the nut body has a generally dovetail shape sized for sliding reception in the dovetail-shaped groove of the channel framing.

10. The channel framing assembly set forth in claim 9, wherein the channel framing includes a slot side having opposing, inwardly extending lips defining a continuous slot in the slot side leading to the open interior of the channel framing, wherein the top of the nut body has spaced apart grooves extending transverse to the length of the nut body, the grooves configured for receiving, when the nut body is secured to the channel framing in the T-shape track, respective inwardly extending lips of the channel framing.

11. The channel framing assembly set forth in claim 10, wherein the nut body has a maximum width extending between the sides of the nut body, the maximum width of the nut body being less than a width of the continuous slot in the slot side of the channel framing, the effective wing span of the first and second wings being greater than the width of the continuous slot.

12. The channel framing assembly set forth in claim 9, wherein the channel framing includes a first side having opposing, inwardly extending lips defining a continuous slot in the slot side leading to the open interior of the channel framing, and second and third sides adjacent the first side and generally opposing one another, the second and third sides having respective internal rails defining shoulders of the internal T-shaped track,
   wherein when the nut body is inserted in the T-shape track, the shoulders restrict inward movement of the fastener nut, relative to the channel framing, within the T-shape track, and the inwardly extending lips of the channel framing restrict outward movement of the fastener nut, relative to the channel framing, within the T-shaped track.

13. The channel framing assembly set forth in claim 12, wherein each of the second and third sides includes an inwardly-extending fitting-securement portion, the fitting securement portions defining the respective internal rails and further defining external dovetail-shaped grooves extending lengthwise of the channel framing, wherein the sides of the nut body have lower portions that flare away from one another toward the bottom of the nut body such that a lower portion of the nut body has a generally dovetail shape sized for sliding reception in the external dovetail-shaped grooves of the channel framing.

14. The channel framing assembly set forth in claim 9, wherein the fastener nut is received in the T-shaped track, the channel framing assembly further comprising a part secured on an exterior of the channel framing, and a fastener extending into the interior of the channel framing and into the fastener opening of the fastener nut, the fastener and the fastener nut together securing the part to the channel framing.

15. A fastener nut for securing a part to a channel framing having a length and an open interior defining at least one internal, generally T-shaped track extending lengthwise of the channel framing, the fastener nut comprising:
   a nut body having a top, a bottom, opposite first and second longitudinal ends, opposite sides extending between the opposite longitudinal ends, a fastener opening extending from the top toward the bottom for receiving a fastener for securing the part to the channel framing, and a length extending between the opposite first and second longitudinal ends; and
   first and second wings extending longitudinally outward from the respective first and second longitudinal ends of the body, the first and second wings having respective terminal ends defining an effective wing span therebetween that is greater than the length of the body such that the fastener nut has a generally T-shaped side profile,
   wherein the fastener nut is insertable in the generally T-shaped track of the channel framing to allow the fastener nut to slide along the length of the channel framing and to restrict transverse movement of the fastener nut in the interior, relative to length of the framing, for use in positioning the fastener nut along the channel framing,
   wherein the sides of the nut body have lower portions that flare away from one another toward the bottom of the nut body such that a lower portion of the nut body has longitudinal end profiles that are generally dovetail-shaped.

16. The fastener nut set forth in claim 15, wherein the wings are resiliently flexible.

17. The fastener nut set forth in claim 16, wherein the wings comprise at least one wire.

18. The fastener nut set forth in claim 15, wherein each of the longitudinal ends of the nut body is rounded from adjacent one of the sides toward the other side.

* * * * *